(12) United States Patent
Baker et al.

(10) Patent No.: US 10,009,480 B2
(45) Date of Patent: Jun. 26, 2018

(54) POLICY MANAGEMENT OF ELECTRONIC DEVICES

(71) Applicant: Kajeet, Inc., McLean, VA (US)

(72) Inventors: Matthew Donald Baker, Potomac, MD (US); Michael Merrill Flood, Bethesda, MD (US); Steven Ira Geller, Rockville, MD (US); Douglas Owen Kesser, Little Silver, NJ (US); Daniel John Neal, Chevy Chase, MD (US); Carol Ann Politi, Bethesda, MD (US); Ben Julian Weintraub, Vienna, VA (US)

(73) Assignee: KAJEET, INC., McLean, VA (US)

( * ) Notice: Subject to any disclaimer, the term of this patent is extended or adjusted under 35 U.S.C. 154(b) by 0 days. days.

(21) Appl. No.: 14/590,862

(22) Filed: Jan. 6, 2015

(65) Prior Publication Data
US 2015/0222759 A1    Aug. 6, 2015

Related U.S. Application Data

(63) Continuation of application No. 13/672,607, filed on Nov. 8, 2012, now Pat. No. 8,929,857, which is a
(Continued)

(51) Int. Cl.
*H04M 1/66* (2006.01)
*H04M 15/00* (2006.01)
(Continued)

(52) U.S. Cl.
CPC ........ *H04M 15/745* (2013.01); *G06Q 10/103* (2013.01); *G06Q 20/105* (2013.01);
(Continued)

(58) Field of Classification Search
CPC ......... H04W 4/24; H04W 4/26; H04W 12/06; H04W 12/08; H04W 12/12
(Continued)

(56) References Cited

U.S. PATENT DOCUMENTS

| 5,221,838 A | 6/1993 | Gutman et al. |
| 5,285,382 A | 2/1994 | Muehlberger et al. |

(Continued)

FOREIGN PATENT DOCUMENTS

| AU | 2006100397 A4 | 3/2007 |
| EP | 0137884 A1 | 7/1983 |

(Continued)

OTHER PUBLICATIONS

U.S. Appl. No. 13/786,986; Non-Final Office Action; dated Oct. 22, 2014; 14 pages.
(Continued)

*Primary Examiner* — Temica M Beamer
(74) *Attorney, Agent, or Firm* — Baker & Hostetler LLP

(57) ABSTRACT

A system and method for the management of a device, including the establishment and enforcement of policies/rules associated with feature or functions that may be performed with the device. Modern devices are capable of many things, including making and receiving calls, exchanging data, playing games and music, sending and receiving email, accessing web sites, and paying for goods and services. Depending on who is using the device, such as a child, student, or an employee, there may be a need or desire to regulate how that device can be used and to determine who will pay for what goods or services. In addition to providing all of the features associated with a device, service providers need to be able to establish and enforce rules (policies)
(Continued)

regulating how and when that device can be used and who will pay for a good or service requested by the user of the device.

20 Claims, 11 Drawing Sheets

Related U.S. Application Data continuation-in-part of application No. 12/950,291, filed on Nov. 19, 2010, now Pat. No. 8,078,140, and a continuation-in-part of application No. 12/950,379, filed on Nov. 19, 2010, now Pat. No. 8,285,249, which is a continuation of application No. 11/881,460, filed on Jul. 26, 2007, now Pat. No. 7,899,438, which is a continuation-in-part of application No. 11/824,336, filed on Jun. 28, 2007, now Pat. No. 7,945,238, said application No. 12/950,291 is a continuation of application No. 11/824,336, filed on Jun. 28, 2007, now Pat. No. 7,945,238.

(60) Provisional application No. 61/557,372, filed on Nov. 8, 2011.

(51) Int. Cl.
    *G06Q 20/10*     (2012.01)
    *G06Q 10/10*     (2012.01)
    *G06Q 20/32*     (2012.01)
    *G06Q 20/40*     (2012.01)
    *G06Q 30/02*     (2012.01)
    *H04M 15/28*     (2006.01)
    *H04W 4/24*     (2018.01)

(52) U.S. Cl.
    CPC ....... *G06Q 20/322* (2013.01); *G06Q 20/3224* (2013.01); *G06Q 20/405* (2013.01); *G06Q 30/0273* (2013.01); *H04M 15/28* (2013.01); *H04W 4/24* (2013.01)

(58) Field of Classification Search
    USPC .................. 455/405–408, 410, 411
    See application file for complete search history.

(56) References Cited

U.S. PATENT DOCUMENTS

| | | |
|---|---|---|
| 5,704,046 A | 12/1997 | Hogan |
| 5,914,472 A | 6/1999 | Foladare et al. |
| 5,953,710 A | 9/1999 | Fleming |
| 6,018,724 A | 1/2000 | Arent |
| 6,026,291 A | 2/2000 | Carlsson et al. |
| 6,076,075 A | 6/2000 | Teicher |
| 6,173,269 B1 | 1/2001 | Solokl et al. |
| 6,205,436 B1 | 3/2001 | Rosen |
| 6,222,914 B1 | 4/2001 | McMullin |
| 6,249,252 B1 | 6/2001 | Dupray |
| 6,345,263 B1 | 2/2002 | Matsumoto et al. |
| 6,529,593 B2 | 3/2003 | Nelson |
| 6,564,047 B1 | 5/2003 | Steele et al. |
| 6,836,651 B2 | 12/2004 | Segal et al. |
| 6,885,877 B1 | 4/2005 | Ozaki et al. |
| 6,957,058 B2 | 10/2005 | Chan et al. |
| 6,968,198 B2 | 11/2005 | Nylund |
| 6,968,385 B1 * | 11/2005 | Gilbert ................ G06F 21/6218 709/229 |
| 6,990,182 B2 | 1/2006 | Nelson |
| 7,024,174 B2 | 4/2006 | Nagy et al. |
| 7,024,390 B1 | 4/2006 | Mori et al. |
| 7,133,846 B1 | 11/2006 | Ginter et al. |
| 7,155,411 B1 | 12/2006 | Blinn et al. |
| 7,206,769 B2 | 4/2007 | Laurent et al. |
| 7,209,957 B2 | 4/2007 | Patron et al. |
| 7,248,855 B2 | 7/2007 | Joyce et al. |
| 7,249,092 B2 | 7/2007 | Dunn et al. |
| 7,302,272 B2 | 11/2007 | Ackley |
| 7,330,717 B2 | 2/2008 | Gidron et al. |
| 7,333,796 B2 | 2/2008 | Scalisi et al. |
| 7,359,880 B2 | 4/2008 | Abel et al. |
| 7,434,723 B1 | 10/2008 | White et al. |
| 7,457,609 B2 | 11/2008 | Cai |
| 7,516,219 B2 | 4/2009 | Moghaddam et al. |
| 7,580,699 B1 | 8/2009 | Shaw et al. |
| 7,593,714 B2 | 9/2009 | Schultz et al. |
| 7,869,790 B2 | 1/2011 | Singh et al. |
| 7,869,792 B1 | 1/2011 | Zhou et al. |
| 7,873,538 B2 | 1/2011 | Karaoguz et al. |
| 7,881,697 B2 | 2/2011 | Baker et al. |
| 7,899,438 B2 | 3/2011 | Baker et al. |
| 7,933,799 B2 | 4/2011 | Aaltonen et al. |
| 7,945,238 B2 | 5/2011 | Baker et al. |
| 7,945,242 B2 | 5/2011 | Kahn |
| 8,019,354 B2 | 9/2011 | Rae et al. |
| 8,068,825 B2 | 11/2011 | Mikan et al. |
| 8,078,140 B2 | 12/2011 | Baker et al. |
| 8,285,249 B2 | 10/2012 | Baker et al. |
| 8,340,638 B2 | 12/2012 | Patterson et al. |
| 8,351,933 B2 | 1/2013 | Ramer et al. |
| 8,577,795 B2 | 11/2013 | Clubb et al. |
| 8,654,687 B2 | 2/2014 | Koorapaty et al. |
| 8,693,358 B2 | 4/2014 | Hodges |
| 8,698,741 B1 | 4/2014 | Wang et al. |
| 8,817,699 B2 | 8/2014 | Liu et al. |
| 8,918,080 B2 | 12/2014 | Neal |
| 2001/0007983 A1 | 7/2001 | Lee |
| 2001/0011250 A1 | 8/2001 | Paltenghe et al. |
| 2001/0032192 A1 | 10/2001 | Laxmiprassad et al. |
| 2001/0047310 A1 | 11/2001 | Russell |
| 2001/0054059 A1 | 12/2001 | Marks et al. |
| 2002/0022472 A1 | 2/2002 | Watler et al. |
| 2002/0055911 A1 | 5/2002 | Guerreri |
| 2002/0123938 A1 | 9/2002 | Yu et al. |
| 2002/0176377 A1 | 11/2002 | Hamilton |
| 2002/0176553 A1 | 11/2002 | Aschir |
| 2002/0177431 A1 | 11/2002 | Hamilton et al. |
| 2002/0178118 A1 | 11/2002 | Hamilton et al. |
| 2002/0179704 A1 | 12/2002 | Deaton |
| 2002/0187772 A1 | 12/2002 | Hyyppa et al. |
| 2002/0193102 A1 | 12/2002 | Hyyppa et al. |
| 2003/0026404 A1 | 2/2003 | Joyce et al. |
| 2003/0055785 A1 | 3/2003 | Lahiri |
| 2003/0083954 A1 | 5/2003 | Namba |
| 2003/0182420 A1 | 9/2003 | Jones et al. |
| 2003/0220835 A1 | 11/2003 | Barnes, Jr. |
| 2004/0018829 A1 | 1/2004 | Raman et al. |
| 2004/0111329 A1 | 6/2004 | Moore |
| 2004/0132431 A1 | 7/2004 | Vandermeijden et al. |
| 2004/0132438 A1 | 7/2004 | White |
| 2004/0139018 A1 | 7/2004 | Anderson et al. |
| 2004/0143550 A1 | 7/2004 | Creamer et al. |
| 2004/0198335 A1 | 10/2004 | Campen |
| 2004/0229600 A1 | 11/2004 | Saez et al. |
| 2004/0235457 A1 | 11/2004 | Florkey et al. |
| 2004/0236688 A1 | 11/2004 | Bozeman |
| 2004/0253941 A1 | 12/2004 | Rivera et al. |
| 2005/0013423 A1 | 1/2005 | Eversen et al. |
| 2005/0096009 A1 | 5/2005 | Ackley |
| 2005/0113130 A1 | 5/2005 | Weinzierl |
| 2005/0171715 A1 | 8/2005 | Saitoh et al. |
| 2005/0216424 A1 | 9/2005 | Gandre et al. |
| 2005/0282559 A1 | 12/2005 | Erskine et al. |
| 2006/0019632 A1 | 1/2006 | Cunningham et al. |
| 2006/0025139 A1 | 2/2006 | Bales et al. |
| 2006/0109969 A1 | 5/2006 | Oh |
| 2006/0116105 A1 | 6/2006 | Frankel et al. |
| 2006/0135140 A1 | 6/2006 | Rothman et al. |
| 2006/0252410 A1 | 11/2006 | Bakita et al. |
| 2006/0276180 A1 | 12/2006 | Henry, Jr. |
| 2006/0293057 A1 | 12/2006 | Mazerski et al. |
| 2007/0003034 A1 | 1/2007 | Schultz et al. |
| 2007/0004386 A1 | 1/2007 | Singh et al. |

(56) References Cited

U.S. PATENT DOCUMENTS

| | | |
|---|---|---|
| 2007/0021102 A1 | 1/2007 | Sherman |
| 2007/0058812 A1 | 3/2007 | Ali et al. |
| 2007/0060100 A1 | 3/2007 | Watler et al. |
| 2007/0077911 A1 | 4/2007 | Raman |
| 2007/0095892 A1 | 5/2007 | Lyons et al. |
| 2007/0099609 A1 | 5/2007 | Cai |
| 2007/0105529 A1 | 5/2007 | Lundstrom et al. |
| 2007/0125840 A1 | 6/2007 | Law et al. |
| 2007/0135135 A1 | 6/2007 | Brown |
| 2007/0155364 A1 | 7/2007 | Andersson |
| 2007/0164098 A1 | 7/2007 | Khalid et al. |
| 2007/0172039 A1 | 7/2007 | Mendiola et al. |
| 2007/0179974 A1 | 8/2007 | Cai et al. |
| 2007/0185983 A1 | 8/2007 | Qi et al. |
| 2007/0198432 A1 | 8/2007 | Pitroda et al. |
| 2007/0243862 A1 | 10/2007 | Coskun et al. |
| 2007/0245026 A1 | 10/2007 | Martin et al. |
| 2007/0267479 A1 | 11/2007 | Nix et al. |
| 2007/0277230 A1 | 11/2007 | Hawkins et al. |
| 2008/0014904 A1 | 1/2008 | Crimi et al. |
| 2008/0015881 A1 | 1/2008 | Shankar |
| 2008/0033880 A1 | 2/2008 | Fiebiger et al. |
| 2008/0039189 A1 | 2/2008 | Walker et al. |
| 2008/0096524 A1 | 4/2008 | True et al. |
| 2008/0119162 A1 | 5/2008 | Sivalingam et al. |
| 2008/0130849 A1 | 6/2008 | Mock et al. |
| 2008/0146211 A1 | 6/2008 | Mikan et al. |
| 2008/0146259 A1 | 6/2008 | Chin et al. |
| 2008/0221985 A1 | 9/2008 | Civanlar et al. |
| 2008/0312968 A1 | 12/2008 | Hannon et al. |
| 2009/0089144 A1 | 4/2009 | Hodge, Jr. |
| 2009/0119132 A1 | 5/2009 | Bolano et al. |
| 2009/0216620 A1 | 8/2009 | Lee |
| 2009/0222517 A1 | 9/2009 | Kalofonos et al. |
| 2010/0064341 A1 | 3/2010 | Aldera |
| 2010/0166169 A1 | 7/2010 | Ma |
| 2011/0275346 A1 | 11/2011 | Fraser et al. |
| 2012/0044807 A1 | 2/2012 | Johnson et al. |
| 2012/0149337 A1 | 6/2012 | Singh et al. |
| 2013/0029653 A1 | 1/2013 | Baker |
| 2013/0065555 A1 | 3/2013 | Baker |
| 2013/0073395 A1 | 3/2013 | Rincon et al. |
| 2013/0117097 A1 | 5/2013 | Bachman |
| 2014/0080471 A1* | 3/2014 | Coskun .................. G06Q 10/10 455/419 |
| 2014/0280758 A1 | 9/2014 | Sharma et al. |

FOREIGN PATENT DOCUMENTS

| | | |
|---|---|---|
| EP | 0172670 A2 | 2/1986 |
| EP | 1041520 A2 | 4/2000 |
| EP | 1072997 A1 | 1/2001 |
| EP | 1132839 A1 | 9/2001 |
| EP | 1450322 A1 | 8/2004 |
| EP | 1528513 A1 | 5/2005 |
| EP | 1798659 A1 | 6/2007 |
| EP | 1798943 A1 | 6/2007 |
| FR | 2863088 B2 | 6/2005 |
| GB | 2419970 A | 5/2006 |
| GB | 2425621 A | 11/2006 |
| GB | 2431072 A | 4/2007 |
| JP | 59-062976 A | 4/1984 |
| JP | 9-179921 A | 7/1997 |
| JP | 9-185658 A | 7/1997 |
| JP | 12-48144 A | 2/2000 |
| JP | 12-251154 A | 9/2000 |
| JP | 12-331100 A | 11/2000 |
| JP | 13-134689 A | 5/2001 |
| JP | 13-291039 A | 10/2001 |
| JP | 15-209880 A | 7/2003 |
| JP | 16-102726 A | 4/2004 |
| JP | 18-139433 A | 6/2006 |
| JP | 18-309786 A | 11/2006 |
| JP | 19-323337 A | 12/2007 |
| KR | 2001088369 A | 9/2001 |
| KR | 2002010160 A | 2/2002 |
| KR | 2002016161 A | 3/2002 |
| KR | 2003044475 A | 6/2003 |
| KR | 2004089144 A | 10/2004 |
| KR | 2005048166 A | 5/2005 |
| KR | 2007018329 A | 2/2007 |
| WO | WO 2001/135353 | 5/2001 |
| WO | WO 2002/084989 A2 | 10/2002 |
| WO | WO 2003/092348 A2 | 11/2003 |
| WO | WO 2004/100094 A2 | 11/2004 |
| WO | WO 2005/015831 A2 | 2/2005 |
| WO | WO 2005/017793 A1 | 2/2005 |
| WO | WO 2005/081664 A2 | 9/2005 |

OTHER PUBLICATIONS

U.S. Appl. No. 13/786,685; Non-Final Office Action; dated Nov. 6, 2014 18 pages.
U.S. Appl. No. 13/916,997; Final Office Action; dated Nov. 14, 2014; 22 pages.
U.S. Appl. No. 13/786,694; Non-Final Office Action; dated Jan. 30, 2015; 32 pages.
U.S. Appl. No. 13/917,035; Non-Final Office Action; dated Oct. 27, 2014; 23 pages.
U.S. Appl. No. 13/917,020; Non-Final Office Action; dated Feb. 18, 2015 20 pages.
U.S. Appl. No. 13/916,997; Final Office Action; dated Jul. 30, 2015; 32 pages.
U.S. Appl. No. 13/917,035; Non-Final Office Action; dated Nov. 6, 2015 29 pages.
U.S. Appl. No. 13/786,694; Non-Final Office Action; dated Jan. 4, 2016; 30 pages.
U.S. Appl. No. 13/917,020; Final Office Action; dated Dec. 14, 2015; 21 pages.
U.S. Appl. No. 13/786,966; Non-Final Office Action; dated Jun. 30, 2015; 16 pages.
U.S. Appl. No. 13/763,348, filed Feb. 8, 2013, Baker.
U.S. Appl. No. 13/786,735, filed Mar. 6, 2013, Baker.
U.S. Appl. No. 13/786,754, filed Mar. 6, 2013, Baker.
U.S. Appl. No. 13/786,775, filed Mar. 6, 2013, Baker.
U.S. Appl. No. 13/786,788, filed Mar. 6, 2013, Baker.
U.S. Appl. No. 13/786,802, filed Mar. 6, 2013, Baker.
U.S. Appl. No. 13/786,685, filed Mar. 6, 2013, Baker.
U.S. Appl. No. 13/786,694, filed Mar. 6, 2013, Baker.
U.S. Appl. No. 13/786,703, filed Mar. 6, 2013, Baker.
U.S. Appl. No. 13/786,730, filed Mar. 6, 2013, Baker.
U.S. Appl. No. 13/786,745, filed Mar. 6, 2013, Baker.
U.S. Appl. No. 13/786,922, filed Mar. 6, 2013, Baker.
U.S. Appl. No. 13/786,950, filed Mar. 6, 2013, Baker.
U.S. Appl. No. 13/786,966, filed Mar. 6, 2013, Baker.
U.S. Appl. No. 13/786,986, filed Mar. 6, 2013, Baker.
U.S. Appl. No. 13/787,004, filed Mar. 6, 2013, Baker.
U.S. Appl. No. 13/786,917, filed Mar. 6, 2013, Baker.
U.S. Appl. No. 13/786,949, filed Mar. 6, 2013, Baker.
U.S. Appl. No. 13/786,974, filed Mar. 6, 2013, Baker.
U.S. Appl. No. 13/787,610, filed Mar. 6, 2013, Baker.
U.S. Appl. No. 13/787,111, filed Mar. 6, 2013, Baker.
U.S. Appl. No. 14/577,616, filed Dec. 19, 2014, Neal et al.
Boyd, "Here Comes the Wallet Phone", *IEEE Spectrum*, Nov. 12-14, 2005, www.spectrum.ieee.org.
Carstens, "Mechanism for Compiling Payment Information on Mobile Terminals", IP.com, #IPCOM000124834D, originally published Jun. 20, 2005, IP.com published Jun. 20, 2005.
Creus et al., "Feature Interaction Control on Smartphones", *IEEE*, 2007, 302-309.
Diesposti et al., "Dual-Use Personal NavCom Service", *IEEE*, 2000, 69-79, 0-7803-5846-5/00.
Ebringer et al., "Parasitic Authentication to Protect Your E-Wallet", *IEEE Computer*, Oct. 2000, 54-60, 0018-9162/00.
Hung et al., "Security and Privacy Aspects of SmartFlow Internet Payment System", *IEEE*, 1999.

(56) References Cited

OTHER PUBLICATIONS

IBM TDB, "Micropayment Scheme", IP.com, #IPCOM000013249D, originally published Apr. 1, 2001, IP.com published Jun. 18, 2003.
Integrated Mobile, Inc., Family-friendly Mobile Services, Presentation, Executive Overview, Nov. 10, 2003, 1-39.
Ishikawa et al., "Mixed-Reality 'Party-Line Night Club'—Synchronization of Networked Avatars and Applications with Mobile Phone Ringtones: Integrating Java3d and LAN-tap Roomware with J2ME", *Proceedings of the 2005 The Fifth International Conference on Computer and Information Technology (CIT'05)*, IEEE, 2005, 0-7695-2432-X/05.
Kostov et al., "Cellular Phone Ringing Tone Recommendation System Based on Collaborative Filtering Method", *IEEE*, 2003, 378-383, 0-7803-7866-0/03.
Labrou et al., Wireless Waller, *Proceedings of the First Annual International Conference on Mobile and Ubiquitous Systems: Networking and Services*, 2004.
Lee et al., "i-Ring: A System for Humming Transcription and Chord Generation", *IEEE*, 2004, 1031-1034, 0-7803-8603-5/04.
Lennox, "Feature Interaction in Internet Telephony," Sixth Feature Interaction Workshop, Columbia University, May 17, 2000, 15 pages.
Leung et al., "On Designing a Flexible E-Payment System with Fraud Detection Capability", *Proceedings of the IEEE International Conference on E-Commerce Technology*, 2004, 0-7695-2098-7/04.
Me et al., "EC-Pay: An Efficient and Secure ECC-based Wireless Local Payment Scheme", *Proceedings of the Third International Conference on Information Technology and Applications*, 2005.
Mjolsnes et al., "On-line E-Wallet System with Decentralized Credential Keepers", *Mobile Networks and Applications 8*, published by Kluwer Academic Publishers, 2003, 87-99.
Pierce et al., "RF Wallet With Fraud Protection", IP.com, #IPCOM000009305D, originally published Jun. 1, 1999, IP.com published Aug. 15, 2002.
Raposo et al., "A Web Agent for Automating E-Commerce Operations", *Proceedings of the IEEE International Conference on E-Commerce*, 2003.
Schmandt et al., "Impromptu: Managing Networked Audio Applications for Mobile Users", *ACM*, 2004, 59-69, 1-58113-793-1/04/0006.
Tang et al., "Distributed Family Wallet Architecture and Secure Inter-Pure Operations", *IEEE*, 2000, 110-111, 0-7803-6301-9/00.
Varshney, "Location Management for Mobile Commerce Applications in Wireless Internet Environment", *ACM Transactions on Internet Technology*, Aug. 2003, 3(3), 236-255.
Yang et al., "A Three-Party Authenticated Key Exchange Scheme Smartcard Using Elliptic Curve Cryptosystem for Secure Key Exchange in Wireless Sensor Network", *IEEE*, 2007.
U.S. Appl. No. 13/603,218: Non-Final Office Action dated Dec. 24, 2012, 6 pages.
U.S. Appl. No. 13/603,218: Final Office Action dated Jun. 10, 2013, 15 pages.
U.S. Appl. No. 13/603,218: Non-Final Office Action dated Nov. 27, 2013, 12 pages.
U.S. Appl. No. 13/786,735: Non-Final Office Action dated Jun. 7, 2013, 43 pages.
U.S. Appl. No. 13/786,754: Non-Final Office Action dated Jun. 4, 2013, 36 pages.
U.S. Appl. No. 13/786,754: Notice of Allowance dated Oct. 18, 2013, 12 pages.
U.S. Appl. No. 13/786,775: Non-Final Office Action dated Jun. 5, 2013, 26 pages.
U.S. Appl. No. 13/786,775: Notice of Allowance dated Sep. 24, 2013, 6 pages.
U.S. Appl. No. 13/786,788: Non-Final Office Action dated Jun. 28, 2013, 24 pages.
U.S. Appl. No. 13/786,802: Non-Final Office Action dated Jul. 2, 2013, 9 pages.
U.S. Appl. No. 13/786,802: Notice of Allowance dated Nov. 1, 2013, 7 pages.
U.S. Appl. No. 13/786,685: Non-Final Office Action dated Jun. 14, 2013, 23 pages.
U.S. Appl. No. 13/786,685: Non-Final Office Action dated Jan. 4, 2014, 30 pages.
U.S. Appl. No. 13/786,694: Non-Final Office Action dated Jun. 20, 2013, 70 pages.
U.S. Appl. No. 13/786,703: Non-Final Office Action dated Jun. 28, 2013, 34 pages.
U.S. Appl. No. 13/786,703: Notice of Allowance dated Nov. 25, 2013, 34 pages.
U.S. Appl. No. 13/786,730: Non-Final Office Action dated Jul. 17, 2013, 30 pages.
U.S. Appl. No. 13/786,730: Notice of Allowance dated Dec. 18, 2013, 15 pages.
U.S. Appl. No. 13/786,745: Non-Final Office Action dated May 31, 2013, 33 pages.
U.S. Appl. No. 13/786,745: Notice of Allowance dated Sep. 16, 2013, 6 pages.
U.S. Appl. No. 13/786,922: Non-Final Office Action dated Jun. 20, 2013, 25 pages.
U.S. Appl. No. 13/786,922: Notice of Allowance dated Dec. 6, 2013, 12 pages.
U.S. Appl. No. 13/786,950: Non-Final Office Action dated Jun. 20, 2013, 28 pages.
U.S. Appl. No. 13/786,950: Notice of Allowance dated Dec. 11, 2013, 12 pages.
U.S. Appl. No. 13/786,966: Non-Final Office Action dated Jun. 20, 2013, 30 pages.
U.S. Appl. No. 13/786,986: Non-Final Office Action dated Jun. 5, 2013, 23 pages.
U.S. Appl. No. 13/787,004: Non-Final Office Action dated Aug. 5, 2013, 25 pages.
U.S. Appl. No. 13/787,004: Notice of Allowance dated Dec. 10, 2013, 12 pages.
U.S. Appl. No. 13/786,917: Non-Final Office Action dated Aug. 5, 2013, 17 pages.
U.S. Appl. No. 13/786,949: Non-Final Office Action dated Aug. 5, 2013, 17 pages.
U.S. Appl. No. 13/763,348: Non-Final Office Action dated Jun. 21, 2013, 21 pages.
U.S. Appl. No. 13/786,974: Non-Final Office Action dated Jul. 5, 2013, 22 pages.
U.S. Appl. No. 13/787,610: Non-Final Office Action dated Jul. 19, 2013, 21 pages.
U.S. Appl. No. 13/787,610: Notice of Allowance dated Dec. 16, 2013, 12 pages.
U.S. Appl. No. 13/787,111: Non-Final Office Action dated Nov. 12, 2013, 17 pages.
U.S. Appl. No. 13/786,735: Non-Final Office Action dated Jan. 29, 2014; 37 pages.
U.S. Appl. No. 13/786,694: Non-Final Office Action dated Feb. 4, 2014; 31 pages.
U.S. Appl. No. 13/744,342; Notice of Allowance; dated Aug. 18, 2014; 26 pages.
U.S. Appl. No. 14/732,440; Non-Final Office Action; dated Sep. 15, 2016; 17 pages.
U.S. Appl. No. 13/917,035; Final Office Action; dated Jun. 27, 2016; 34 pages.
U.S. Appl. No. 13/917,035; Non-Final Office Action; dated Nov. 16, 2016; 35 pages.
U.S. Appl. No. 13/917,020; Final Office Action; dated Nov. 17, 2016; 35 pages.
U.S. Appl. No. 13/916,997; Non-Final Office Action; dated May 9, 2017; 37 pages.

\* cited by examiner

CONTACT MANAGER

Use the Contact Manager to:
Allow or block calls and text messages from specific phone numbers. Tell me more
Decide whose wallet pays for specific calls and text messages. Tell me more Steve's Contacts       Steve 🗘

| Contact | | | Allow Calls/Texts? | | Override Restrictions | Who Pays? | | |
|---|---|---|---|---|---|---|---|---|
| Update | Name | Number | Yes | No | | Admin Wallet | Steve Wallet | Grandma Wallet |
| Edit Remove | jack | 301-555-5555 | ◎ | | | ◎ | | |
| Edit Remove | jeff | 240-555-5555 | ◎ | | ◎ | ◎ | | |
| Edit Remove | All Other Numbers | | ◎ | | ◎ | ◎ | | |
| Edit Remove | jane | 202-555-5555 | ◎ | | ◎ | ◎ | | |

Save settings       Add new contacts

| ◎ | 911 Calls | 911 | Emergency calls to 911 are always free. |
| ◎ | Customer Care | 866-4kajeet | Calls to kajeet care are always free. |
| ◎ | 900-# Calls | 900-XXX-XXXX | 900-number calls are always blocked. |

---

Daniel's Wallet
You have $70.53 in your wallet

Refill / See Activity
Learn about my wallet

ACCOUNT OVERVIEW

Eleanor
301-XXX-XXXX
Wallet Balance: $0.00
Log in as Eleanor

Low Balance Alert!
Refill now
Set up auto refill

Ryan
240-XXX-XXXX
Wallet Balance: $13.76
Log in as Ryan

Steve
775-XXX-XXXX
Wallet Balance: $29.95
Log in as Steve

See all accounts

FIG. 3

| | |
|---|---|
| 50 | FEATURE MANAGER<br>To use the Feature Manager, first select the appropriate child on your account:<br>Show features for<br><br>Feature Selections for Mike<br>Here you can select the features that Mike can use on his kajeet phone. To change the setting for a particular feature, click the appropriate "Edit Setting" link. |
| 52 | Ringtones, Wallpaper, Games & Applications    Allowed    Edit Setting<br><br>Ringtones, wallpaper, games and applications are all files that can be downloaded to your child's phone. Ringtones and wallpaper allow your kid to personalize the phone and games and applications entertain or enable your kid to do something (e.g. GoogleMaps can help your kid find their way). |
| 54 | Feeds    Allowed    Edit Setting<br><br>Feeds enable your child to receive text messages for a particular topic, sent by kajeet. For example, kajeet offers sports, horoscopes and other feeds. Kajeet text messaging rates apply. |
| 56 | Mobile Web Surfing    Not Allowed    Edit Setting<br><br>Your child can surf the mobile web from the kajeet phone to check email or other web sites. |
| 58 | Picture Messaging    Allowed    Edit Setting<br><br>With picture messaging your child can snap a picture with a kajeet camera phone and send it in a picture message to a friend, or receive picture messages. |
| 60 | Instant Messaging    Unlimited Monthly    Edit Setting<br><br>With AOL Instant Messaging on your kajeet phone, you can send unlimited Instant messages to anyone anywhere anytime. |

Feeds

Feeds enable your child to receive text messages for a particular topic, sent by kajeet. For example, kajeet offers sports, horoscopes and other feeds. Kajeet text messaging rates apply. Note: selecting "Not allowed" disables all text messaging.

Do you want Mike to be able to subscribe to feeds?

◎ Allowed

◎ Not Allowed

Save Settings

FIG. 5

Add money to your wallet right now...
This is where you put the "pay" in "pay as you go." Use your credit card to add money to any wallet in your account right now.

It's as easy as 1, 2, 3: Want to know more about wallets? _____

1. Whose wallet do you want to refill? _____

2. How much do you want to add? _____

3. Do you want to pay by credit card or transfer money from another wallet? _____

<u>Add money now</u>

80

... or set up an automatic refill
Setting up automatic refills lets you manage your wallets on a budget and schedule that's right for you!

Set up a new automatic refill:

Whose wallet do you want to refill? _____

How much do you want to add? _____

Add _____ whenever this wallet has less that _____

Add _____ every month on _____

Add _____ every week on _____

Pay with the following credit card on file: _____

82

<u>Update credit card</u>              <u>Submit automatic refill</u>

Give the gift of a wallet refill

Anyone with a kajeet phone would love to receive a refill as a gift, so you've come to the right place!

All about your generous gift:

Refill a wallet associated with your account

Enter the number of the kajeet phone you're gifting with a refill:
_____

How much are you sending as a gift:
_____

The lucky recipient of this gift will want to know who sent it, so enter your name in the space below:
_____

Enter a message in the space below for the recipient:
_____

Please review all information carefully before clicking "Buy Now".

CANCEL       BUY NOW

---

Payment Information

Your email address: _____

Select a payment option: _____

Enter card number: _____

Expiration date: _____

Security code: _____

First name of cardholder: _____

Last name of cardholder: _____

Address: _____

City: _____

State: _____

Postal code: _____

FIG. 7

POLICY MANAGEMENT OF ELECTRONIC DEVICES

CROSS REFERENCE TO RELATED APPLICATIONS

This application is a continuation of U.S. patent application Ser. No. 13/672,607, titled "Policy Management of Electronic Devices," filed Nov. 8, 2012, now U.S. Pat. No. 8,929,857, issued Jan. 6, 2015, which claims benefit under 35 U.S.C. § 119(e) of U.S. Provisional Application No. 61/557,372, titled "Policy Management of Electronic Devices," filed Nov. 8, 2011, the contents of which is incorporated herein by reference in its entirety.

U.S. patent application Ser. No. 13/672,607 is also a continuation-in-part of and claims priority to: U.S. application Ser. No. 12/950,291, titled "System and Methods for Managing the Utilization of a Communications Device," filed Nov. 19, 2010, now U.S. Pat. No. 8,078,140, issued Dec. 13, 2011, which is a continuation of U.S. application Ser. No. 11/824,336, titled "System and Methods for Managing the Utilization of a Communications Device," filed Jun. 28, 2007, now U.S. Pat. No. 7,945,238, issued May 17, 2011; and a continuation-in-part of U.S. application Ser. No. 12/950,379, titled "Feature Management of a Communication Device," filed Nov. 19, 2010, now U.S. Pat. No. 8,285,249, issued Oct. 9, 2012, which is a continuation of U.S. application Ser. No. 11/881,460, titled "Feature Management of a Communication Device," filed Jul. 26, 2007, now U.S. Pat. No. 7,899,438, issued Mar. 1, 2011, which is a continuation-in-part of U.S. application Ser. No. 11/824,336, filed Jun. 28, 2007, now U.S. Pat. No. 7,945,238, issued May 17, 2011. Each of the afore-referenced applications is hereby incorporated by reference in their entirety.

BACKGROUND

Postpaid cellular phone (cell phone) and other types of wireless services typically allow the user of a cell phone or other product to spend unlimited amounts of money for services. In other words, there is nothing to stop the user from running up a huge bill. Many parents have experienced this issue with their children, prompting the parents to take their children's phones or devices away or to otherwise restrict their children's access to the phones or devices, collectively referred to as cellular phones, cell phones and/or devices herein. Unfortunately, contemporary society requires that parents have the ability to contact their children by cell phone and vice versa, so the cell phones are often provided to the children despite the possibility of future abuse.

Smartphones and other digital devices allow users to access a wide variety of content and applications. Some of the content and applications are inappropriate for use by minors or use in certain environments (e.g., during school, at the office, etc.).

The same type of issue exists between employers and employees and other parties in similar administrator/user relationships with respect to the use/abuse of cell phones and other devices. For example, an employer may want an employee to have a communications or mobile computing device, but may not want to pay for certain services or applications that the employee can access with the device or may want to limit how, when, and how much of those services or applications can be used by the employee. Likewise, a government agency or school might be willing to pay for or subsidize certain communications services or applications, but not others. Without the ability to somehow restrict the employee's ability to use services or applications that the employer does not want to pay for or to shift payment obligations for those services or applications to the employee or some other third party, many employers are forced to give their employees the devices anyway and hope for the best.

One partial solution to the problems associated with postpaid cellular phone abuse is the prepaid cellular phone or device. Prepaid phone services limit spending because the user of the phone can only use what has been paid for in advance. Many children, however, are not responsible or mature enough to adequately track and maintain their prepaid phone service accounts, and many parents have too many other obligations to keep close track of their children's cell phone use, so as to make sure the phone service accounts are adequately funded all of the time. The net result can be disastrous. For example, if a child uses up all of the funds in their prepaid account, and their phone service provider shuts down access to its services, the child will not be able to call a parent in the event of an emergency, or arrange to be picked up after school or a sporting event, etc.

Thus, a prepaid phone service does not solve the problem of ensuring availability of key services even if the prepaid account has run out of money. In addition to insuring the safety of their children, many parents, employers and others would like to be able to exercise administrative control over the services and activities that a child, employee, etc., is allowed to pay for out of their prepaid account, but prepaid accounts have heretofore not been structured to provide such administrative control or feature management. Feature management can encompass many activities, such as preventing a feature or service from being used entirely, limiting how much a feature or service can be used in a given time period, limiting the other party or parties with whom the feature may be used, or limiting when a given feature or service can be used (i.e. time of day, days in month, etc.).

Prior attempts by prepaid service providers to address these problems have only resulted in partial solutions. Some service providers have provided for rollover usage minutes, which are minutes that were not used as part of a user's service plan and are allowed to roll over to the same user for use in the next month. In some cases, this might prevent a user from running out of minutes in the next month, but it does not guarantee that the user will not use up all of their monthly minutes, plus the rollover minutes, and be denied access to key services anyway. Other service providers have provided an automated refill service, which automatically bills some amount to a credit card to recharge the user's prepaid account in the event the balance in the user's account gets too low. However, a prepaid phone service with an automated refill service is the equivalent of a postpaid phone service and would therefore have the same problem with potential abuse as a postpaid service. In other words, there is no spending limit on the phone service.

Postpaid services have also attempted to address these problems by offering users unlimited usage packages that limit a user's exposure to running up charges. However, for parents who are also interested in preventing their children from sending 300, or even more, text messages per day with their phone, or running up a huge bill for services that are not included in the "unlimited usage package," such as downloaded games or ringtones, unlimited usage offerings are not a complete solution. Another partial solution is to provide the administrator (parent) with an alert when a user has reached some limit for a service. For example, a parent could be alerted when a child has spent more than $10 on text messages within a certain period of time. An alert, however, does not actually limit usage of the service, it just warns the parent that the limit has been reached, at which point the parent has to intervene to prevent further abuse, such as by taking the phone away from the child, which is one of the problems with postpaid services in the first place.

It is further known in the art to provide an account for a user of a prepaid phone, such as a cellular phone, in which funds are stored electronically for future use of the phone. For example, a service provider could establish an account for a user, in which funds can be stored, such as through use of a credit card charge or electronic transfer from a bank account. In some cases, corporate customers with multiple users under the same service provider might be able to have a single account for their business, with subaccounts assigned to certain phones and charged to the particular departments within the corporation to which the employees using those phones correspond. Some service providers also provide affinity accounts, which include special rates and promotions for groups of people belonging to a similar business, club, etc. In each case, however, these accounts operate separate from one another in that all of the charges for a particular phone are charged to a particular account, rather than some charges being billed to one account while other charges are billed to another account. The same is true with respect to discounts and promotions, i.e., a discount or promotion is either applied to an existing account or it is not.

Finally, it is further known to establish some measure of parental or administrative control over an account. The Telcordia™ Converged Real-Time Charging system allows users to place limited real-time controls over prepaid and postpaid accounts. For example, when an account allows a child to download premium data (data for which a charge is imposed), parental controls over that account can be set to limit that child's spending within a set of parameters. This system and other solutions, however, are only partial solutions to the problem of providing limits on overspending and other activities by the user while simultaneously assuring that the user will always be able to use the phone when appropriately needed.

SUMMARY

A system and method for the management of a device, and more particularly to the establishment and enforcement of policies or rules associated with the feature or functions that may be performed with the device. Modern devices are capable of many things, including making and receiving calls, exchanging data, playing games and music, sending and receiving email, taking pictures, recording video, using software applications, accessing web sites, and paying for goods and services. Depending on who is using the device, such as a child or an employee, there may be a need or desire to regulate how that device can be used and to determine who will pay for what goods or services. In addition to providing all of the features associated with a device, service providers need to be able to establish and enforce rules (policies) regulating how and when that device can be used and who will pay for a good or service requested by the user of the device.

BRIEF DESCRIPTION OF THE DRAWINGS

FIG. 3 illustrates a contact management interface accessible via a website in accordance with an embodiment;

FIG. 4A illustrates a feature management interface accessible via a website in accordance with an embodiment;

FIG. 4B illustrates a webpage enabling various forms of content filtering in accordance with an embodiment;

FIG. 5 illustrates an edit setting screen for feeds based on the feature management of FIG. 4A;

FIG. 6 illustrates the wallet refill and auto-refill features accessible via a website in accordance with an embodiment;

FIG. 7 illustrates a wallet gift refill feature accessible via a website in accordance with an embodiment;

DETAILED DESCRIPTION OF ILLUSTRATIVE EMBODIMENTS

Figure 1:
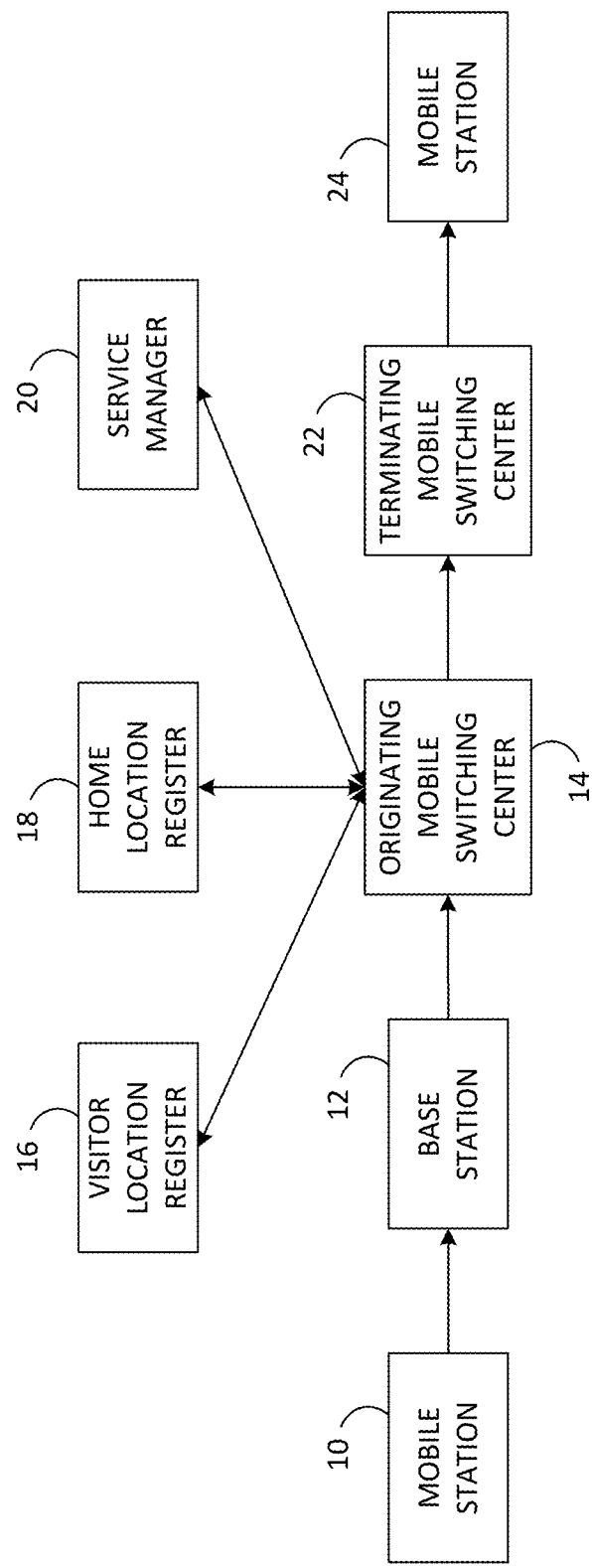
FIG. 1 is a flow chart illustrating, at a high-level, the process of initiating and permitting a service to be initiated.

The present invention is directed to the real-time management of a device in general, and more particularly to the management of a phone by an administrator, such as a parent, guardian, financier, employer, supervisor, or responsible party, who can specifically control the use of a device, such as a phone, through management of its features and the wallets associated with the device. In the context of the present invention, a wallet is like an electronic account that has certain added features that accounts do not have and which can be used in additional ways that accounts are not used. A wallet can also be a singular item that includes a number of control features or a collection of items, each having their own control features, which operate in conjunction or cooperate with one another to achieve the same purpose as a singular item.

An account would typically include configuration settings for different services available to a user assigned to the account, would include a user's profile information, and would provide the user with the ability to manage the features that are activated for the account. Feature management can be implemented with or without wallets, but is illustrated herein with wallets to provide a more thorough explanation of how feature management works. Some of the features of a wallet that are added to an account include how money is entered into the wallet, who holds or has access to the wallet, the rules that apply to how each wallet can be used for different services, and the hierarchical use of the wallets for each service.

Managing features associated with a phone empowers the administrator to control how the phone is used and goods and services are paid. For example, a common problem with providing a child a cell phone is that they have free reign over downloading ringtones and games. Through feature management, rules can be established for managing the downloading of content, including: (1) turning off the download capability entirely; (2) limiting how many ringtones and/or games can be purchased in a given time frame; (3) turning off other functions of the phone; (4) customizing features associated with a function of the phone; (5) sending alerts when a certain dollar or unit threshold has been reached over a given time frame; (6) choosing which types of content may be downloaded or accessed by the device based upon content rating or other parameters; (7) choosing to have the administrator pay for specific types of content, like educational applications or work productivity applications; (8) choosing to have a third party pay for specific types of contents or applications; (9) using a pre-defined or dynamically-created filter on such things as downloadable content or surfable Web sites (i.e. set to only allow games to be purchased with an "E" rating); or (10) choosing the time frame (time of day, days of week, etc.) when downloads can occur.

It is noted that while embodiments described herein are described in terms of a phone or mobile device, the teachings of embodiments herein can be applied to other devices, including a gaming device; a media player; a desktop computer; a laptop computer; a smart phone; a tablet, netbook or notebook computer; a photocopier; a scanner; a printer; and other devices connected to a network. The teachings are also not limited to a physical device. Instead, teachings described herein are also applicable to local and remote services, applications, and websites.

Wallets also differ from accounts in that multiple wallets can be tied to a single device, such as a phone, a single wallet can be tied to multiple devices, and wallets can be completely dynamic, i.e., the wallet is not tied to any one device. For example, a dynamic wallet could be a "picture messaging" wallet, where that wallet is only used for photo services, which may be funded by the administrator, the user of the phone, or an outside party (i.e. friends or family). That dynamic wallet could apply to a single user's wallet, or across multiple wallets in a given account (e.g., across children in a family or employees in a company).

Additional wallets can also be used as back up payment sources for a single wallet associated with a device or multiple devices. These additional wallets can be set up to automatically cover the cost of specific services for the device(s) or as back-up for the user wallet in the event it runs low on funds. If the user of a prepaid phone is a child that needs to call their mother, but the child's wallet is low on funds, the mother's wallet could be used to cover the cost of the call from the child to her. For even greater security, the mother's wallet could be backed by a credit card that automatically adds funds to the wallet when needed so there could be no possibility of the mother's wallet running out of money. Alternatively, an alert could be sent whenever the child's wallet is low on funds or below a level specified by the user. The parent could respond to the alert to enable the funds to be added to the wallet associated with the child's device. For instance, the parent could respond to the alert message received with a "YES" or "NO" response, with "YES" indicating that funds can be added from either the mother's wallet or from the credit card to the child's wallet.

It should be noted that although the term "funds" is used herein to refer to the value stored in or charged to a wallet, an electronic wallet could also be used to store and spend almost any type of unit of value, whether money, credits, or some other indicator.

Returning to the example above, the wallets assigned to the child's phone could also be arranged so that calls with family members were always covered by the parent's wallets, but calls with the child's friends were always covered by the child's wallet. Other "goods" (where "goods" includes both hard goods in the real world (e.g., one's lunch) and digital goods (e.g., a software application or digital magazine)) and services, in addition to calls, such as downloads of applications, games, wallpaper, ring tones, etc., or the sending and receiving of SMS text messages, could be allocated between the different wallets as well, with some services being paid by the parent, some services being paid by the child, or any other arrangement they prefer. In the context of goods, the different wallets could be utilized as a type of electronic payments system, debit card, etc., but subject to the same type of policy management as the services. For example, a child may be allowed to use the child's wallet to buy lunch at school, or educational books from a company such as Scholastic, but not to buy ringtones or non-education/entertainment books from the same vendor.

Requiring a child to pay for certain goods and services can be a very effective way to help teach that child the difference between "want" versus "need," which tends to be much clearer to children when they are forced to buy something they "want," but do not "need," with their own money.

Of course, the organization and structure of wallets is not limited to just phones or devices for children. Such wallets are effective tools for any phone user that requires some level of supervision, such as a handicapped individual, a person suffering from dementia, a corporate employee, or even an adult that has shown poor judgment in the past and requires help managing their affairs. Additionally, wallets could support a wide and various range of devices including communications, computing or game devices and a range of users and administrators including corporate sponsors, government agencies, schools, healthcare providers and employers. For example, a phone associated with a user wallet and an administrator wallet could be provided to an employee, such as a child care provider, that enables the child care provider to only call or receive calls from a parent of the child being watched, and emergency services, but no one else. Alternatively, the phone could be set up without restrictions, but with multiple wallets that allocated out the expense of calls to the appropriate parties. For example, calls to and from parents could be managed so as to be paid by the parents, along with emergency calls and other such things, whereas all other calls, such as personal calls made by the child care provider, could be managed so as to be paid for out of the child care provider's wallet. Therefore, a parent or administrator can set up a plurality of rules indicating a first set of conditions or events which are covered by a first wallet, a second set of conditions or events which are covered by a second wallet, etc.

Additional wallets, such as promotional wallets established by the phone service provider, could be used to cover the cost of other services, for a specified period of time, for a specified number of services, or for any of numerous other purposes. Likewise, dynamic wallets could be established that could be used in association with any device and/or other wallets for any purpose, whenever the owner of the dynamic wallet so chooses.

With respect to any device/phone for which one or more wallets are established, there would be an administrator, such as a parent, employer, guardian, governmental entity, etc. The administrator would be responsible for establishing the rules or parameters under which the phone and the phone user's wallet could be used. If so desired, the administrator could establish an administrator's wallet that was tied to the same phone or multiple phones and establish additional rules or parameters under which the administrator's wallet could be used in place of or in conjunction with the user's wallet. As the administrator for one or more phone wallets, the administrator could also move money between different wallets. This would enable a family or company or governmental entity to manage their device service (including voice, SMS, data, etc.) budget in a manner that was not possible with a traditional bulk "shared plan," i.e., a 1000 minute/month voice bundle, where every user assigned to the plan had an equal ability to use the plan.

Before explaining feature management and wallets in greater detail, the manner in which wallets can be utilized in a telecommunications network will first be described. Although wallets could be implemented in any type of situation, a mobile telecommunications network is referenced in FIG. 1 as a particularly environment for the implementation of wallets. It is to be understood that alternative embodiments using a different environment are also possible without departing from the spirit of embodiments described herein. Thus, wallets can be associated with any type of device that is subject to use by someone other than the administrator and that can be in communication with an appropriate control network. This type of device is referenced herein as a communication device, not because the device is used for communication, but because it is capable of being in communication with the control network. Hence, the "device", as defined herein, could be a PDA, a photocopier, a game, a computer, a network device, magnetic strip card, a software application, a website, a bicycle, or any type of device or object or system that one could imagine that is capable of being remotely controlled by logical rules. Also, the types of items that could be purchased or used by the device or ways in which the device can be controlled are only limited by the nature of the device. While a cellular phone is usually used to make phone calls, it can also be used for many other functions, including send and receive text messages, download and play games, music, movies, etc., and even make purchases of other objects or services that have nothing to do with the device, such as a gift at a shop, or a drink from a soda machine.

In an embodiment, one wallet can be used to pay for one type of service or application, and a second wallet can be used to pay for a second type of service or application. In institutions, organizations and companies, it is often necessary to assign expenses to different accounts, as the different expenses may originate from different sources. It is often also necessary to track and monitor the different expenses within an institution, an organization or a company. The combination of the policy enforcer and the wallets enables services from one device, such as a photocopier, to be controlled via policies and rules created by the administrator, and for charges associated with the photocopier to be associated with a given wallet. A high level of granularity is also possible. In the photocopier example, black and white copies can be charged to a first wallet, while color copies can be charged to a second wallet.

Figure 8:
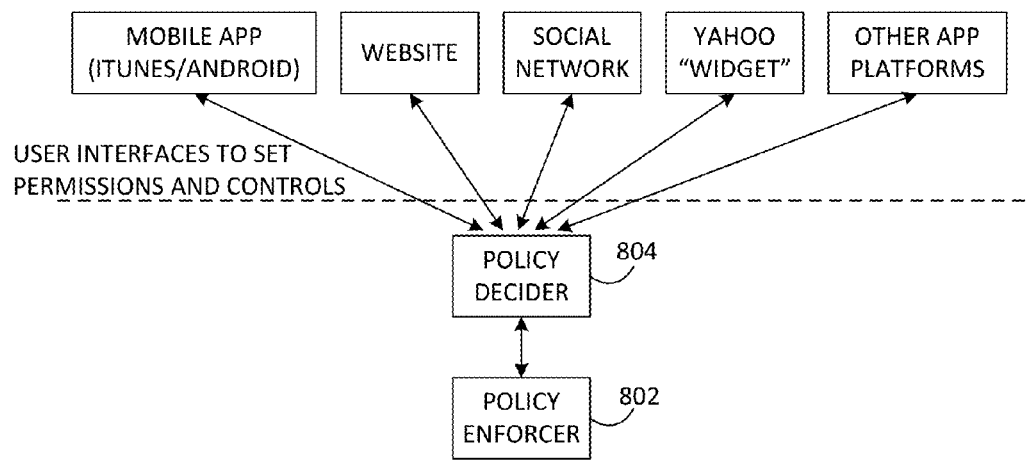
FIG. 8 is a block diagram illustrating the relationship between the policy enforcer and the policy decider, and between the policy decider and a plurality of user interface layers.
Figure 9:
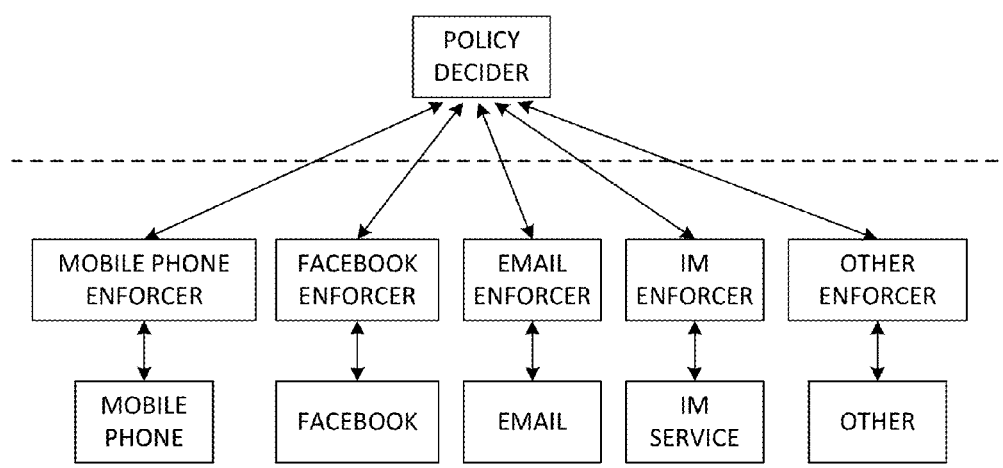
FIG. 9 is a block diagram illustrating in greater detail the relationship between the policy decider and a plurality of policy enforcers customized to a particular device, service, or application.

FIG. 1 illustrates an embodiment of a phone or mobile station 10, such as a cellular phone, smart phone, personal data assistant (PDA), or any other type of mobile computing platform, being utilized to originate a service, such as a call or message, using common standardized methods, e.g., as defined in IS-136 (a TDMA standard), IS-95 (a CDMA standard), etc. While this embodiment is particularly relevant to a wireless telecommunication device operating within a wireless voice network environment, it is just an example, and the invention is not limited to this embodiment. Client-server environments could take the place of the wireless voice network, the policy decider(s) and policy enforcer(s) could be implemented in different forms and different types of networks and devices that take the place of wireless telecommunication networks and devices, goods or services having nothing to do with voice communication or mobile device applications could take the place of voice services, etc. Likewise, the policy decider(s) and policy enforcer(s), such as illustrated in FIGS. 8 and 9, could be embodied in the electrical circuitry, firmware or other logic of a single integrated circuit or a set of integrated circuits (a chip set) embedded in any type of device.

As illustrated in FIG. 1, the phone/mobile station 10 would first establish a connection with a base station 12, which would in turn connect to an originating mobile switching center (O-MSC) 14. Upon receiving the origination request for a service from the base station 12, the O-MSC 14 would attempt to authenticate the mobile station 10 by querying a visitor location register 16 and a home location register 18 to determine if the mobile station 10 is registered with the telecommunications network and authorized for use on that network, collectively referred to as "validation."

Upon successful validation, the O-MSC 14 would trigger the service manager 20, based on standardized methods, e.g., as defined in IS-41, IS-771, IS-826, etc. The service manager 20 would first authenticate the subscriber of the mobile station 10 based on their mobile directory number (MDN) and/or their mobile subscriber identification (MSID), or some other type of identifier, as a valid subscriber. The term "subscriber" is used to generically define the person or entity that subscribed the phone to the telecommunications network, whether that happens to be the user or an administrator. If the subscriber is not valid, the subscriber will be notified through the mobile station 10 and the session will be terminated. If the subscriber is valid, the service manager 20 will then enforce the provisioned voice and/or SMS and/or data policies or rules for the particular user of the mobile station 10, which includes, but is not limited to, wallet balance, wallet state/status, provisioned services, other functions or functional restrictions (such as contact restrictions, time-of-day restrictions or allowed number list functions/blocked number list restrictions), user selected service controls, etc. If the user fails any of the provisioned policies, the user may or may not be notified and the session will be terminated. The provisioned policies are established by one or more global rules and/or one or more local rules, as further described below. Operation of the service manager with respect to data service feature management (data policy) establishment and enforcement is further illustrated in FIG. 2.

If the session is allowed to progress, the service manager 20 will then rate and charge the service transactions requested during that session. To do this, the service manager 20 again looks to the global level rules and the user level rules that have been established for the device in question. In addition to including or establishing the provisioned policies, the rules establish an order of precedence as to how the device/phone is to be administered and how authorized service transactions are going to be charged. The global rules are checked first. If a service transaction requested can be categorized according to one of the global rules, the service transaction will be rated and charged according to the global rules. For example, the phone service provider could establish that any call to its customer support phone numbers will be allowed and should always be free to its users, in which case the user level rules would not apply.

Embodiments are not limited to rating and charging service transactions as they are requested or per session. In a particular embodiment, service and application transactions are charged per billing cycle, or at a specific period of time, rather than being immediately charged. Such a scenario would be the case on a post-paid account. Assuming that a customer gets a monthly bill, and during the month makes various phone calls and sends/receives various text messages, at the end of the month the carrier processes the monthly bill. It is at this point that the various services used by the customer are charged to one or more wallets. The phone calls made by the customer may be charged to a first wallet, while the text (SMS) messages may be charged to a second wallet. Similarly, if a customer was using a phone for personal calls and for work-related calls, at the end of the billing cycle personal calls can be charged to a personal wallet, while work-related calls can be charged to a business wallet. Different bills can also be generated for different wallets. For instance, a first bill can be generated for charges associated with the personal wallet and sent to the customer, while a second bill can be generated for charges associated with the business wallet and sent to the corresponding company.

The user level rules define how a user is to be rated and charged once it is determined that the global level rules do not apply to the service transaction request and/or payment. Additional rules can also be established that work in between the global rules and the user rules, such as promotional wallet rules and dynamic wallet rules. These additional rules can be integrated as follows: for each phone/mobile station, the service manager 20 has a variety of phone/mobile station wallets allocated to support multiple services and functions, such as a user wallet, and administrator wallet, and a promotional wallet. If the service transaction request has been authorized by the global rules, the service manager 20 would then check to see if the service transaction could be charged to another wallet.

For example, a promotional wallet could be established to discount certain transactions, or to provide rewards or credits for particular services, or to provide certain free transactions. While some wallets may contain financial credits (e.g., money), other wallets, such as a promotion wallet, may contain financial credits, credits that have only nominal value, and/or credits that have no cash value or nominal value (e.g., promotional credits). If the promotional wallet applies and there is a sufficient balance of something in the promotional wallet, then the promotional wallet would be decremented so as to reduce that value, unless of course the promotional wallet was being incremented for the use of a service or as a reward of some type instead. If the service transaction is not a promotional activity, the service manager 20 will apply other user level rules and either charge the user's wallet or the administrator's wallet. Dynamic wallets are further described below, but they would work in a similar fashion. Promotional wallets and dynamic wallets, and any other types of wallet, is not limited to providing rewards or credits to a single user or device and can be shared by multiple users and multiple devices.

Whether a charge for a service transaction of a user or device is taken from the user's wallet, the administrator's wallet, or some other wallet, depends on the user level (local) rules established by the administrator for that user. Hence, the administrator has the ability to specify unique service transactions as being charged to their wallet versus the user's wallet through use of unique identifiers for each service transaction (e.g., MDNs to be charged to the administrator's wallet for voice/SMS/MMS, content identifiers to be charged to the administrator's wallet, IM screen names to be charged to the user's wallet, etc.). In the context of a pre-paid phone, a wallet would typically include a balance that corresponds to some amount of United States Dollars deposited with the service provider. In other contexts, as noted above, a wallet could be designed to hold any unit of value in place of dollars, including other currency types, service units, assets, or even something completely made up that only has value in some limited context, like virtual money in a multiplayer, on-line, role playing game.

Once the service transaction has been rated and charged, the service transaction is permitted to continue. If the service transaction is a call, a download, a text message or any other service that requires the user's phone/mobile station 10 to be connected to another mobile station or device connected to a mobile station, a connection would be established to the terminating mobile switching center (T-MSC) 22 and then connected to the mobile station 24, assuming mobile station 24 or the device connected to it is available and the service transaction can be completed.

Figure 2:
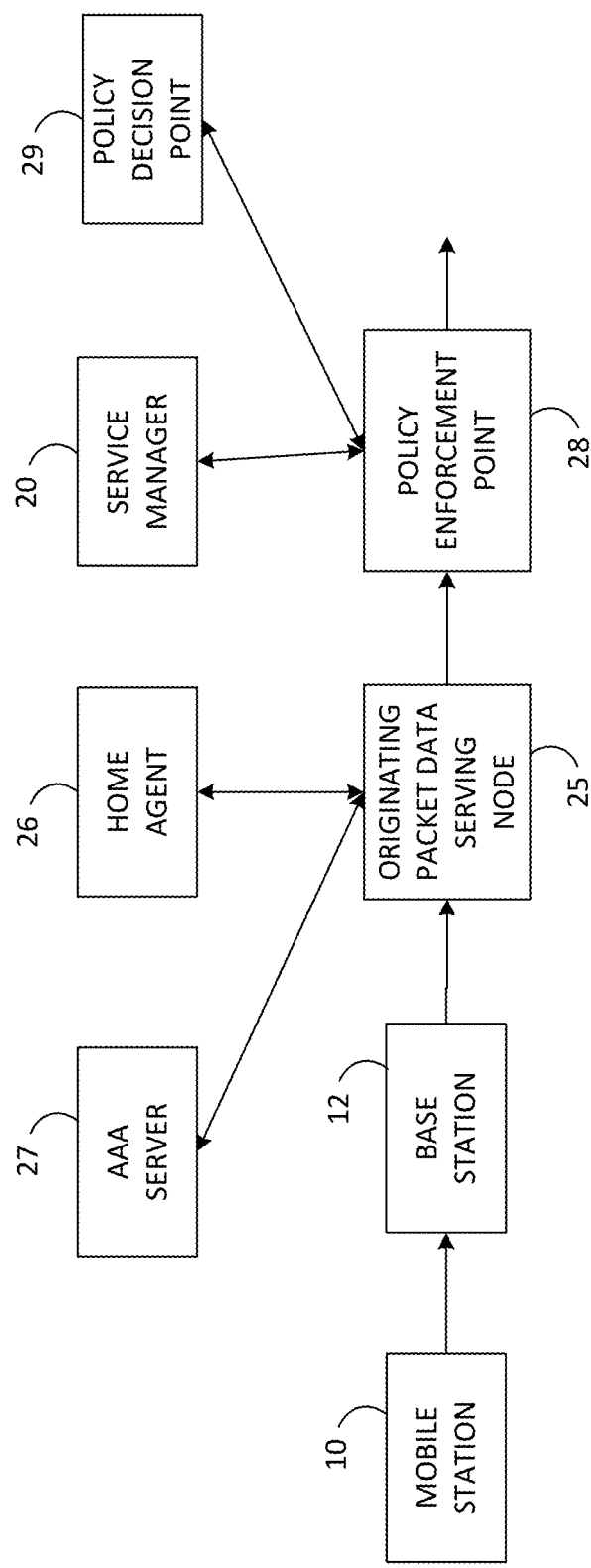
FIG. 2 is a flow chart illustrating the process of initiating a data session for a mobile device, checking the data policies associated with that device, and enforcing those data policies.

FIG. 2 provides a description of how a mobile communication device is utilized to originate a data session and how data service feature management operates. As in FIG. 1, the mobile station 10 originates a session (data in this case, but could also be voice as shown in FIG. 1) by establishing a connection with base station 12, which in turn connects to an originating packet data serving node (O-PDSN) 25. The O-PDSN 25 acts as a gateway by providing access to the Internet, intranets and applications servers for the mobile station 10 and acts as a client for the home agent 26 and the authentication, authorization and accounting (AAA) Server 27. Upon receipt of an origination request for a service from the base station 12, the O-PDSN 25 will attempt to validate the request. Validation involves first attempting to authenticate the mobile station 10 by querying the AAA Server 27 and the home agent 26 to determine if the mobile station 10 is authorized to perform the requested action within the carrier network. If the mobile station 10 has been validated, the O-PDSN 25 will obtain an IP address for the data session and route the mobile station 10 to the appropriate policy enforcement point (PEP) 28.

The PEP 28 is a logical element that can be physically housed in another packet data serving node, a gateway device, a chip set, etc., depending on the service request, such as a wireless application protocol (WAP) gateway, instant messaging gateway, email gateway, multimedia messaging service gateway, or other form of gate, etc. The PEP 28 is responsible for enforcing a decision by the service manager 20 and policy decision point 29 to accept or reject the service request.

The PEP 28 operates in conjunction with the policy decision point (PDP) 29, and depending on the configuration of the network possibly the service manager 20, to authenticate the subscriber of the mobile station 10 as a valid subscriber, based on their MDN and MSID, or some other type of identifier. The PDP 29 is also a logical element that can be physically housed in the service manager 20, a chip set or in another server accessible to either the service manager 20 or the PEP 28. The PDP maintains or stores a list of policies that have been established to control the features and functions of the mobile station 10 and decides, based on those policies, to either accept or reject the service request.

Such requests might be initiated by the device, such as when the user of the device sends a request to download some type of content, such as a game, a ringtone, a website, a picture message, a text message, etc. In other cases, the request might be initiated by another device seeking to communicate with the user's device. For example, the user of mobile station 10 might have a text message sent to her/him by a friend, but if a policy is in place that prevents the user from receiving text messages at the time the message is sent, then the request to communicate with the user will be denied. Likewise, the user's request may not have anything to do with making a call or downloading content, but rather just to use some feature or function of the device, such as a game that is already stored on the device. Even in this instance, the device would need to communicate with the PDP to determine if a policy is in place that would prevent use of the feature or function for some reason, such as the wrong time of the day, the wrong day of the week, the game has been played in excess of some time limit set on the game, etc.

In situations where the subscriber is not valid, PEP 28 will notify the subscriber through the mobile station 10 and take one of a number of different possible actions, such as terminating the session or transaction associated with the service request, redirecting or rewriting the session or transaction, degrading the session or transaction to a lower quality or class of service, etc. If the subscriber is valid, PEP 28 will enforce the provisioned policies for the particular subscriber of the mobile station 10. As noted above, these policies can cover many different rules that apply to the features or functions of the device based on requests sent to or received from the device. These policies, include those items noted above, but also include many other things, such as wallet balances, wallet state/status, provisioned services/features, user selected service controls, and other functions or functional restrictions, such as URL restrictions, content type restrictions, time-of-day restrictions, quality/class of service restrictions, etc.

If any of the provisioned policies fail (e.g., a restriction is met), the subscriber may or may not be notified and the PEP 28 will take one of a number of different possible actions, such as terminating the session or transaction, redirecting or rewriting the session or transactions, degrading the session or transaction to a lower quality or class of service, etc. When the requester is not the subscriber, it may be preferable to notify the requester or notify both the requester and the subscriber. For example, if someone attempted to call the user, or send an email, Instant message, or text message to the user, and there was a policy in place that prevented the call or communication, then it might be necessary to tell that someone so they know why they cannot contact the user at that time. It may also be necessary to notify the subscriber or an administrator so they know what happened as well. If all of the policies pass, then the session or transaction associated with the service request is permitted to continue.

Wallets can be set up and administered in a number of different ways. For example, in the pre-paid cell phone context, the administrator and user could sit down together at a computer connected to a website associated with the service provider of the phone and view and/or edit wallet settings for that user's phone. The administrator could also call the service provider and administer the user wallet and administrator wallet over the phone. While the user wallet is generally going to be associated with the device being used, which itself will have some form of unique identifier, the administrator wallet will not necessarily be tied to just the one device. Hence, the administrator wallet, like any of the other wallets that could be established (promotional, dynamic) just needs to have a unique identifier that could be used to associate the administrator wallet with each of the devices it will be managing.

An example of a system for managing a number of user wallets from within a single administrator wallet, in accordance with a preferred embodiment of the present invention, is illustrated in FIG. 3. The Contact Manager 30 generally illustrated in FIG. 3 is in the form of a webpage on a website that enables an administrator to manage one or more wallets associated with that administrator and/or multiple users. The Contact Manager 30 can also be used by the users to manage their user wallets in a similar fashion. Since the Contact Manager 30 illustrated in FIG. 3 is a webpage, underlined text indicates hypertext or hyperlinks that can be selected with a pointing device to go to other webpages or even other websites.

As shown in FIG. 3, Daniel is the administrator, as indicated in area 32 and has administrative rights over three shown users, Eleanor, Ryan and Steve, and an unspecified number of additional users. The wallet summaries for Eleanor, Ryan, and Steve are shown in the Account Overview area 34. The additional user wallets would be visible if the "See all accounts" option, located below area 34, was chosen.

Daniel is shown to have a balance of $70.53 USD in his administrator wallet shown in area 32. Eleanor's name, phone number, and a balance of $0 USD in her wallet, are shown in the upper part of Account Overview area 34. Likewise, Ryan's and Steve's names, phone numbers, and wallet balances are also shown in area 34. Both Ryan and Steve have positive cash balances in their wallets. Because Eleanor has a zero balance, she also has a low balance alert shown below her wallet summary to alert Daniel. As Eleanor has a zero balance, she cannot initiate a service unless Daniel has indicated that he would be willing to pay for the service from his wallet or has authorized some other wallet to apply to any service transaction desired by Eleanor.

Based on this alert, Daniel is presented with the options of informing Eleanor to add money to her wallet or adding money to Eleanor's wallet on his own. Although many different methods of refilling a wallet could be provided, the two options shown are to refill Eleanor's wallet now or to set up an automatic refill for Eleanor's wallet. The refill and auto-refill options are further discussed with respect to FIGS. 6 and 7 below. The low balance alerts could also be set at different levels other than zero. The administrator or the user could set the low balance level for a wallet at $5 USD or $10 USD, or set multiple low balance alerts that are each treated the same or in different ways. For example, a first alert could be sent only to the user, such as through an email, a text message, or in some other manner, while a second lower balance level alert was sent only to the administrator. The administrator therefore has the ability to customize the activities or events that trigger the sending of alerts, to select the recipients associated with each alert, and the content to include with each alert.

The Contact Manager 30 serves a number of purposes, including: (1) to enable the administrator to manage all of the wallets associated with that administrator; (2) to establish certain general rules that control device functions and payment; and (3) to establish certain local rules that control device function and payment. As shown in FIG. 3, Daniel has chosen to manage Steve's wallet. The arrow 35 next to Steve's name would activate a drop down menu that would enable Daniel to select a different user wallet to manage, such as Eleanor's wallet or Ryan's wallet. Since Steve's wallet has been selected, Steve's Contacts are illustrated in the local rules area 36. The global rules associated with Steve's wallet are illustrated in the global rules area 38.

Figure 4B:
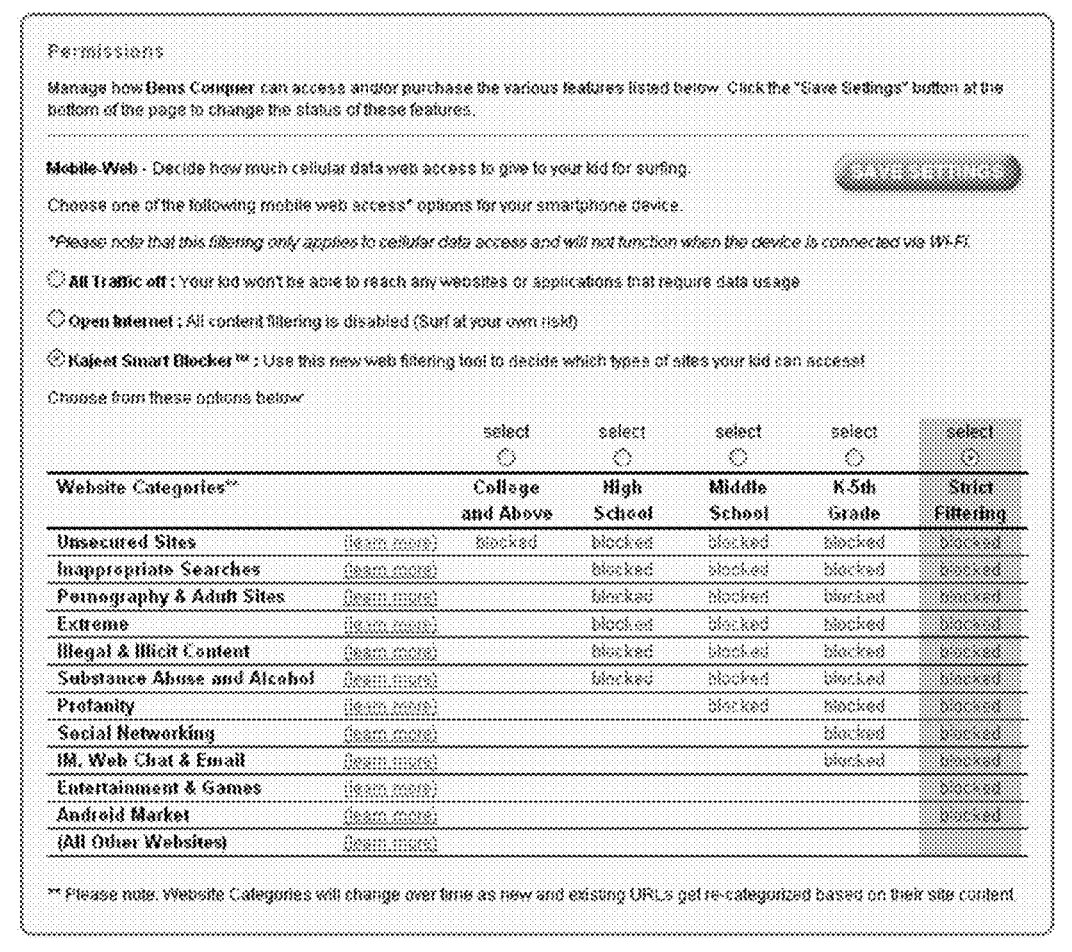

The Contact Manager 30 could be configured to enable Daniel to manage many additional or different services or functions (downloads, etc.) for Steve in the same manner as calls and text messages are illustrated in areas 36 and 38. For example, in addition to indicating the names and numbers of people that Steve can or cannot communicate with by calls or text, referred to herein as allowed number lists/blocked number lists or contact management function, the Contact Manager 30 could also be configured to enable Daniel to select and manage the features or functions of Steve's phone that Steve could use, such as the ability to use the wallet to pay for physical goods at a store using the phone, (i.e., a feature management function), or the time of day during which the phone could be used in general or for specific purposes (e.g., okay to call Jeff, but only between 3 pm and 6 pm), i.e., a time management function. A separate page could also be provided, as illustrated in FIGS. 4A and 4B, that combines various restrictions on specific features, such as choosing for Steve when that feature can be used, how much it can be used (if at all), and who is going to pay for the feature or function, as shown by FIG. 4A, or other forms of filtering/control, as shown by FIG. 4B. Dynamic wallets could also be managed on that web page or on another web page on a per-person or per-feature basis.

As used herein, the term "blocked number list" refers to a list of phone numbers that have been blocked, both in terms of sending calls/texts to Steve's phone and receiving calls/texts from Steve's phone. The term "allowed number list" refers to a list of phone numbers that have been permitted, both in terms of sending calls/texts to Steve's phone and receiving calls/texts from Steve's phone.

Although many different functions associated with Steve's phone could be managed through Daniel's wallet, in order to more clearly illustrate how the Contact Manager 30 would be used to manage Steve's wallet, FIG. 3 only illustrates one function, the contact management function. The additional functions, such as feature management and time management would be similarly structured and could be shown as part of the Contact Manager 30, or as separate management functions on other web pages, as illustrated in FIGS. 4A and 4B. In addition to managing a specific function within a function manager, it is also possible to override functional controls within one function manager from within another function manager. This point is further described below with respect to the "Override Restrictions" feature 40 of the Contact Manager 30.

The local rules established for Steve in local rules area 36 include the contact and payment rules associated with three specific people and their phone numbers and the general category of "All Other Numbers." For each contact, Daniel can decide to either allow calls/texts to the contact, or to block such calls/texts, by clicking on the circular radio buttons illustrated in area 36. When a radio button has been selected or clicked, the central area of the radio button is darkened. When the radio button has not been selected, the central area is clear. Daniel can also specify whose wallet will be used to pay for any such calls/texts.

As illustrated, calls/texts to Jack are allowed and are to be paid for out of Daniel's wallet. Since Daniel is the administrator of Steve, Daniel's wallet is referred to as the "Admin Wallet." Different language, other than "Admin Wallet," could obviously be used in different contexts. For example, if Daniel was Steve's parent, Daniel's wallet could be referred to as a parent wallet. If Daniel was an employer and Steve an employee, Daniel's wallet could have a different name, etc. Since Daniel has indicated he would pay for any calls/texts to or from Jack and Steve, even if Steve had no money is his wallet, Jack and Steve would still be allowed to communicate and the charges would be charged to Daniel's wallet.

While calls/texts with Jeff are also permitted, they are to be paid for by Steve out of his wallet, since Steve's wallet has been selected. If Steve runs out of money in his wallet, however, he would no longer be able to communicate with Jeff until Steve refilled his wallet because neither the Admin wallet nor Grandma's wallet has also been selected. It should be noted therefore that the wallets are not mutually exclusive. Hence, with respect to Jeff, both Steve and Grandma's wallet could be selected at the same time, or even all three wallets (Admin, Steve and Grandma) could be simultaneously selected. In such a case, additional local rules would be used to establish an order of precedence between each of the wallets. For example, calls with Jeff would first be paid for by Steve, but when Steve ran out of money, Grandma would cover the cost of such calls, either for a limited amount of money, for a limited amount of time, or until Grandma ran out of money as well, in which case the Admin wallet would be charged. Many other orders of precedence could obviously be established.

With respect to Jane, any call or texts are permitted and will be paid for out of Grandma's wallet. In this case, Grandma's wallet is a dynamic wallet that is associated with Steve's wallet and Steve's device, but is not controlled by Grandma. Grandma has set up a wallet, put funds in it and indicated to Daniel that her wallet can be used by Steve for the specific purpose of calling Jane. Grandma's wallet could also be associated with any of a number of different administrators, and different users, for different purposes and functions with respect to each user. In this case, Grandma's wallet only has a unique identifier that enables it to be associated with other wallets as she so directs, but is not associated with any particular device, per se. Grandma's wallet could also just be associated with Steve's wallet or even the Admin wallet without any specific function associated with it. Thus, Steve and the Admin could use the funds in Grandma's wallet, as determined by the Admin, for any purpose they might choose.

Also shown in FIG. 3 is the name of "All Other Numbers." Because the "No" choice was selected for "All Other Numbers," no calls/texts to or from any numbers other than those shown in the local rules area 36 are permitted by the local rules. Since no communication is permitted with numbers other than Jack, Jeff and Jane, there is no need to designate whose wallet would be charged for such communication. FIG. 3 further illustrates an "Override Restrictions" function 40, which serves as a local rule that can be used to override any restrictions on functions applicable to Steve, such as a time of day restriction. An override restriction could be set up to be very narrow or very broad. As illustrated in FIG. 3, the override restriction is unspecified, so it could apply to only a narrow set of functional restrictions established by other local rules on web pages not shown herein, or to any other functional restrictions that could have been established.

The Override Restrictions feature 40 can be useful for parents that want to restrict generally when a child can use a phone, except with respect to communication with certain people. For example, if Jack was a child care provider for Steve, Daniel would want Steve to be able to contact Jack at any time, and vice versa, even if Steve was not otherwise allowed to use his phone between 9 am and 3 pm, i.e., during school hours. The ability to regulate when a phone can be and cannot be used can also be of value to parents and school districts with respect to resolving one of the greatest conflicts that exist between parents/students and school administrators—mobile phone usage by kids. Parents want children to have a mobile phone with them so the child can call the parent if need be, e.g., if someone forgets to pick the child up after school. School districts do not want the children to have the phones at all because they claim the students may misuse the phones, e.g., to call friends during school, to cheat, to engage in illegal activity, etc. While the school districts believe that children should be relegated to only using the school phones if the children need to contact a parent, the parents want the children to have the phones with them in case they get locked out of the school, get lost on a field trip, etc.

The override restrictions feature 40 can be used in many other contexts as well and is not limited to just overriding a restriction on time of day usage, which could be the manner in which this function is used with respect to FIG. 3. Basically, any restriction that might be in place due to a local rule could be set up to be overridden. If another local rule was established to regulate the downloading of some game, or the use of some other features/functions, or the use of the device in some other context, activation of the override restrictions function would cause that local rule restriction to be by-passed until the override restrictions function was deactivated. Thus, the override restrictions function can be activated based on one or more activities, events, or rules. Similarly, a different set of activities, events, or rules can trigger the deactivation of the override restrictions function.

It is further noted that on devices provided by an educational institution or by some other third party, such as devices provided to mail carriers by the U.S. Postal Service, the educational institution or the third party can specify the degree of control available to be exercised by the parent/administrator, including whether the parent can override rules specified by the education institution or the third party. For example, an educational institution may choose to not create policies associated with the issued devices, leaving the responsibility to create the policies to the parents. Alternatively, the educational institution may create a set of policies which are global to all of the students, and which cannot be overridden by the parents, only allowing the parents to make additional rules or only allowing the parents to make minor changes to the policies created by the educational institution. Even if the educational institution specifies a global set of policies for all of the students, in a particular embodiment an exception rule can be provided that allows the devices issued to one or more students to be controlled by the parents. Similarly, an administrator or an employer who issues devices to a group of users or to employees, can configure the degree of control that each user has over the device issued to him or her. In the Postal Service example, devices for mail carriers could be subject to rules of the local Postmaster, and then, above that, other general rules of the regional Postmaster, and so forth up the organization line.

As illustrated in FIG. 3, only Daniel is permitted to manage Steve's phone, but Steve's phone could also be set up to be managed by Steve's school as well. For example, Daniel could register with a mobile phone service through the school that permits Steve to have his phone with him at school, rather than in a locker, but which tightly controls how the phone can be used during school hours. For example, only certain functions or features could be enabled during school hours so the phone could not be used to cheat, or to play games, or to call other students, but the phone could be used to call a parent or certain other people that were permitted to be called. If Steve's phone had some form of location feature associated with it, i.e., a feature that enabled the phone's location to be determined, even through a rough estimate, the school control function could be set to only be operational when Steve's phone was on or near school property. In this manner, if Steve had to walk home, or was on a field trip, the phone would still work as permitted by Daniel, even if the school had other limiting control on Steve's phone at that time. Additionally, the school could decide to restrict functions or features by specific groups, such as by grade or by people participating in specific activities.

Management of the phone could also be based on other factors aside from location or time, such as using inputs from the device or other sources regarding movement, such an accelerometer in the device or a third party service that is capable of determining when a device is in motion and can communicate that movement to the policy decider. Hence, if the device was moving above some threshold speed or other criteria, or it is determined that the user is using any kind of vehicle (e.g., car, skateboard, bicycle, etc.), such that use of the device might be unsafe, the device's usage could be restricted in some manner by the policy enforcer.

Area 42 includes additional functions that enable changes to area 36 and 38 to be saved, or for new contacts to be added.

Obviously, the local rules could be much more extensive than as illustrated in the local rules area 36 of FIG. 3, which is also true with respect to the global rules shown in global rules area 38. As illustrated in FIG. 3, only three global rules are illustrated: (1) 911 calls are allowed and are always free; (2) Customer Care Calls are always allowed and are free; and (3) 900-number Calls are not allowed. Since these are global rules, even though the local rules do not allow calls and texts to or from numbers other than those contacts listed in Steve's contact, calls to 911 and to Customer Care Calls would be permitted despite the local rules. In the same context, even if the local rules permitted calls to other numbers, by selecting a global rule blocking 900-number calls, the global rule applies first and the local rules are not considered.

Although the administrator wallet would typically be arranged to cover zero balances in the user's wallet, this arrangement could be reversed under certain circumstances. For example, if a service was designated as being paid from the administrator's wallet, but the administrator's wallet had a zero balance, rather than block the service, the payment could be set to revert back to being paid by the user's wallet, or another wallet (Grandma's wallet) as described above. This type of arrangement ensures maximum security for both the administrator and the user with respect to important or critical services, provided any of the other wallets have money in them.

In addition to paying for certain services, the administrator can choose to move funds or units of value or notional credits, such as airtime and service units, between wallets. For example, the administrator could manually transfer $10 USD from the administrator's wallet to the user's wallet at any time, or the administrator could set up an automatic transfer of specified amounts at specified times. In the context of a parent administrator and a child user, a transfer of money from the administrator's wallet to the phone user's wallet could be structured to mirror a real-world "allowance." The administrator could also move funds/units between different user wallets or even permit or control how different users "trade" funds/units between their wallets. For example, two employees might trade funds between their wallets or two children might trade electronic toys, merchandise, phone usage units, or funds for their phones through their wallets. A service provider might also automatically, periodically or occasionally move credits to a wallet, either from another wallet or some other sources under the service providers control, that can be used to pay for services for loyalty-building, usage incentive, marketing, goodwill, or other purposes.

As previously referenced, FIG. 3 illustrates how an administrator can control features or functions associated with a subscribers phone, in that case who the subscriber can call or not, and who pays for which calls, but could also be configured to enable the administrator to control more features and functions. Alternatively, a separate application or web page 50 could be established to enable the administrator to control various additional features or function, as illustrated in FIGS. 4A and 4B. As shown in FIG. 4A, the administrator of the account for a subscriber named Mike is given the ability to manage five additional features associated with Mike's kajeet® phone (kajeet is a registered trademark of kajeet, Inc.), certain types of downloads 52 (e.g., ringtones, wallpaper, games and applications), feeds 54, mobile web surfing 56, picture messaging 58 and instant messaging 60.

For example, Mike's parent could decide that picture messaging is too dangerous for Mike because of his age and decide to disable that feature. To do so, as illustrated in FIG. 4A, the parent would select the "Edit Setting" link with picture messaging 58, and then change the setting from its current setting of "Allowed" to "Not Allowed," as is the case with mobile web surfing 54 as shown in FIG. 4A. Mike's parent could likewise decide to enable an instant messaging subscription. As shown in FIG. 4A, instant messaging 60 is currently set to "Unlimited Monthly," but it could be set to "Not Allowed" or "50 Message/Month" or "$10/Month," or almost any other setting that made sense to use.

FIG. 4B illustrates an embodiment of a web page that allows a parent or administrator to manage the cellular data web access of a device user. As illustrated, the web page shown in FIG. 4B allows a parent to manage a user's (Ben's) access to and/or ability to purchase various content, data, features, etc. from his device ("Conquer"). Initially, the administrator has a number of options that allow the administrator to make broad choices about how much cellular data web access the device user is to be given. For example, if the administrator selects the "All Traffic Off" option, the device user is not allowed to access any websites or applications, but if the administrator selects the "Open Internet" option, the device user is allowed to access all websites and applications. A third option allows the administrator to customize the level of access according to some additional options that are configured to provide access that is appropriate for device users within a variety of age ranges.

Although there are many different ways in which an administrator could be given the ability to customer access level, the Kajeet Smart Blocker option illustrated in FIG. 4B provides one embodiment. This embodiment gives the user the ability to block websites that fall into various categories, including websites that are unsecured, inappropriate keyword searches, pornography and other forms of adult websites, extreme websites that do not constitute pornography but are nevertheless inappropriate for certain device users, websites that include illegal and illicit content, websites that include information that promote substance abuse and alcohol, websites that include profanity, social networking websites, websites that provide access to instant messaging, web chat and email, websites that provide access to entertainment and game applications, websites that include applications available for the ANDROID phone, or any of a number of other websites. Links can be provided that allow the administrator to understand the type of content blocked under each of the categories.

As noted above, options allow the administrator to select some pre-selected options, including the college and above option, which only blocks unsecured websites, the high school option, which allows profanity websites and other types of communicative, social and entertainment websites, but blocks more adult websites, the middle school option and the K-5th grade option, which are increasingly more restrictive. The final option illustrated is strict filtering, which blocks everything but the other types of websites not otherwise blocked. An option not illustrated, but within the scope of the present embodiment, is to allow an administrator to select the categories that the administrator wants to block on a one by one basis. For example, the administrator could allow entertainment and games, profanity and extreme websites, while blocking everything else. Also, while the embodiment illustrated in FIG. 4B is directed to cellular access, similar concepts could be directed to other forms of wireless access, such as WiFi.

The parent could also have the option of enabling or disabling a group of services all at once, as illustrated in FIG. 5. In this case, when the "Edit Setting" link for feeds 54 was selected, a new feeds page 70 was displayed that presented the parent with the ability allow or disallow feeds, which are a form of text messaging. As shown in FIG. 5, turning off feeds would disable all SMS or text messaging, not just the feeds described on page 70. Naturally, feeds page 70 could be set up differently, so that text messaging was allowed, except for text messages being sent by kajeet, or maybe only certain types of text messages sent from kajeet—the options are truly endless. Likewise, any feature could be established to be configured by the user in many different ways. For example, instead of having separate settings for downloads 52, mobile web surfing 56, and instant messaging 60, all three of these features could be disabled with a single "off" switch, button, etc.

The actual users of the phone might also have the same or similar options with respect to the feature manager as the administrator, but the administrator might have the ability to override the user and/or prevent the user from doing something in the future. Alternatively, the user could have functions that they could enable on their own. For example, a child using a cell phone might have the ability to sign up for Instant Messaging 60, but the parent might decide that it costs too much money, turn the subscription off, and prevent the child from signing up for it again. Likewise, a child might be able to turn on ringtones and wallpaper downloads 52, which the parent could then turn off if needed, but only the parent could turn on games and applications. As previously stated, the combination of options is unlimited.

Further enhancements to the feature manager could include the ability to limit how much of a specific feature can be used, when it can be used, whether dynamic wallets can be used with that feature, picking a group of users attached to that account that the settings apply to, etc.

As previously noted, a service provider could also establish promotional wallets or enable dynamic wallets. Although the global rules and local rules determine the interaction between user wallets and administrator wallets, as additional types of wallets are added, a hierarchy between the wallets would be required to ensure that requested services were taken from the most appropriate wallet first.

Under this hierarchy, before the global or local rules were checked to determine which wallet was designated by the administrator to pay for a service, the promotional wallet would be checked to determine if the service would be covered by the promotional wallet. For example, if a promotion involved giving 10 free voice minutes to a user, those 10 minutes would be placed in a "voice" promotional wallet that would then be used first before determining whether additional minutes would be taken from the user's wallet or the administrator's wallet.

However, the global and local rules would still need to be checked to make sure that the service was permitted. This prevents a promotional wallet from being used to call a 900-number when calls to 900-numbers would otherwise be blocked by the global rules.

As discussed above with respect to Grandma's wallet in FIG. 3, a dynamic wallet would be a wallet that was set up by someone, like a grandparent, but that was not necessarily tied to any particular user or device/phone number. Like the other types of wallets, a dynamic wallet could be filled with funds or units and used to enable a variety of services for a number of other users or the user of the dynamic wallet by either being associated with one or more devices or one or more wallets. To prevent conflicts with an administrator's wallet or a user's wallet, a dynamic wallet would not be able to authorize services for a user that were blocked by the administrator, but could pay for those services that were allowed. A dynamic wallet could also be configured to take precedence over a promotional wallet or even a user's wallet with respect to paying for services, or could simply be used as an additional backup wallet in the unlikely event all of the other wallets for a phone were not available, as previously described.

Although the wallets described herein are described in the context of being used with a mobile device, particularly a pre-paid cellular phone, wallets could be associated with any type of device, as described above. Some of the key features of wallets in the context of the present invention are: (1) that they enable management or control of a device; (2) that each device requires at least two wallets to be associated with it, at least one user wallet and at least one administrator wallet; (3) that an order of precedence can be established between the wallets, as to which wallet pays for what, and any wallet can be used to back up a payment by a second wallet in the event the second wallet is low on funds/credits; and (4) that local rules and global rules can be established for the wallets that enable the administrator to manage the functions of a device in many different ways, including who can be contacted, what transactions are permitted, what time of day the device and features/functions can be used, what features or functions are enabled, etc. Global rules and local rules can be applied in order, so as to result in two separate decisions, or at the same time as a single decision (e.g., if local rule X is true and global rule Y is true, then allow the function to proceed).

Two methods of refilling a wallet are illustrated in FIG. 6. The manual refill area 80 allows the administrator/user to decide whose wallet is going to be refilled, how much is to be added, and the method of payment, such as a credit card or a transfer of money/units from another wallet. Transfers could be paid for and arranged in other ways as well, including the transfer of funds from a phone or device on another network. For example, if someone had the phone number of a user, funds could be transferred to the user's wallet by accessing a website (as shown in FIG. 7 below) or calling customer service to enable the fund transfer. Funds could also be transferred from a person's cell phone to a wallet by charging the amount of the cost of the transfer to that person's cell phone bill, like mobile-commerce (M-commerce) payments or other forms of micropayments. The automatic-refill area 82 likewise allows the administrator/user to select a wallet and to automatically add funds/units to the wallet when the wallet gets to a certain balance level, or every month at a specified time, or every week on a specified day. Automatic-refills could be paid in all of the different ways in which manual refills are paid. If the credit card to be charged needs to be added or changed, the hypertext 84 would be selected. If the person making the refill was happy with what they had entered, the hypertext 86 would be selected.

Automatic-refills can also be added to a base plan. For instance, a customer buying a $15 recurring plan can increase that recurring plan by an extra amount that is allocated to a specific wallet, a specific service, or a specific product. The customer can pay $16.50, with the extra $1.50 going into a wallet for text messaging, or into a wallet for the customer's child, etc.

FIG. 7 illustrates a gift refill webpage that would enable any person to add funds to a user's wallet as a gift. Gift wallets could be used for giving gifts or alternatively for receiving gifts, and would work effectively the same regardless of the direction of giving. As shown in FIG. 7, in the gift refill area 90, as long as the person using the webpage knows the phone number of the phone associated with the user's wallet, that person could add a gift amount, tell the user who made the gift to them, and even send the user a message. Payment area 92 enables anyone wishing to make a gift of a wallet refill to register and provide payment information (a credit card is shown, but a wallet transfer or some other method of payment could also be used) to pay for the refill and for future use.

FIGS. 3-7 illustrate the feature management interface accessible via a website in accordance with an embodiment. However, access controls for monitoring, customization of features, usage policy setting, location tracking, budgeting and walleting, and communication with a particular device can be supported via various interfaces, in addition to via a website. Access controls include monitoring, control, feature and usage policy settings, location control, budgeting, wallet management, and communication with a child's device. For example, as further illustrated and explained in reference to FIG. 10, a FACEBOOK application can be used to send a text messages or other communications to a user, to check the balance and recent activity for a user's device, to track the location of the user, to send automated reminders, to transfer balances, and to purchase and send downloads to a user's device as gifts. Gifts can include applications, ringtones, wallpapers, music, videos, etc. Similar access controls can also be provided via a plurality of user interface layers and a plurality of devices. The plurality of devices includes the IPHONE device, ANDROID devices, SYMBIAN devices, BLACKBERRY devices, among others. The plurality of user interface layers includes social networking sites, desktop applications, mobile device applications, desktop widgets, and web widgets.

While limits on usage of services and applications were discussed above based on one or more conditions, in yet another embodiment usage of services and applications can be controlled based on an allocation per period of time or other factors. A device may have a monthly amount for an application or service, such as a monthly amount of 1000 text messages per month, monthly amount of bandwidth utilized or data usage, expressed in any size of bytes of data or some other form. However, rather than allowing a user to spend the total monthly amount in less than one month, the monthly amount can be allocated on a per-day basis, a per-week basis, or on a basis of time configured by a user, such as allocations per two days, per two weeks, etc. This enables for usage of applications and services to be controlled with great flexibility. For example, a family phone plan may have a total of 1000 text messages per month, but the parent may decide to impose a daily limit of 20 text messages on the child's phone to avoid having the child incur extra fees due to excessive texting, or personally using all of the text message allotment that is intended to be shared with others.

Usage limits can be set based on a plurality of conditions, including limits based on the type of device, the user of the device, the contact communicating with the device, a time of day, a day of the week, etc. For instance, a parent can create a policy that sets a daily text message limit of 100 text messages, but with the number of text messages limited to only five during school hours or during a particular time of day. Similar daily limits and allocations per time period can be imposed on calling minutes, data usage, etc. Other usage limits could be based on business, environmental, governmental and other conditions or factors. For example, a tornado warning or touchdown, a hurricane, earthquake or other disaster in an area could turn off all or impose certain limits on devices in order to insure that necessary communications were possible. Likewise, a change from Defcon 2 to Defcon 3 could change limits for military personnel, a change in terrorist warning alerts could change limits for people in an airport, etc.

Usage limits can also be imposed by one or more administrators, assuming that the override function is enabled. An educational institution, for example, can purchase 1 GB of data service for each student per month, while setting an allocated daily limit of 50 MB, ensuring that students do not run out of data access mid-month. The administrator can also be given control over unused services relative to the daily limit (such as pooling services unused), setting hard limits on the unused services, or allowing unused services to carry over to the next day or the next corresponding time period. For example, if a child had a daily limit of 100 texts, and only used 5 text messages in one day, the unused 95 texts can be allowed to rollover to the next day, so that the next day imposes a daily limit of 195 texts. The rollover function can be enabled or disabled by the administrator. The administrator can further control the distribution of unused services to a temporary pool or to some other wallet. For example, if there are 95 unused texts, then those unused 95 texts can be collected on a prize pool to be awarded at a future point in time. If a child received good grades, then the administrator can have the option of give the child a number of texts from the prize pool to be used at any time, regardless of the daily limit. The texts collected in the prize pool can also be distributed to other users or saved in case other users exceeded their corresponding quota.

The imposing of the daily limit supports careful time and data-consumption budgeting by kids, students, and even by adults who find the need for the imposed limits to avoid going over budget. For children and students, it encourages personal responsibility and management, teaching them to do their homework efficiently and not to waste time on extraneous activities that require use of bandwidth.

In one embodiment, the charge for a single service, application, or even an entire service plan can be distributed over one or more wallets. In the simplest example, a parent and the child can split the cost of a service plan 50/50. Similarly, the cost for an individual service or product, such as the cost for a game, an application for a mobile device, a music download, a video download, etc., can be split 50/50 between the parent and the child. It is further noted that cost need not be distributed equally over one or more wallets. Instead, a first wallet may cover 60% of the cost while a second wallet may cover 40% of the cost.

The charge or cost of a service, application, or a service plan can also be divided based on usage history. For instance, if a child typically spends 70% of the total text messages in a text messaging plan, compared to 30% text messaging by the parent, then the cost for text messaging can be allocated such that the child pays 70% of the text messaging plan while the parent pays for 30% of the text messaging plan. The distribution of charges can also be used as a means of rewarding a child. For example, if a child typically pays on their own for extra data services, such as media and application downloads, then the parent may pay 50% of the total cost for data services for a month as a reward. The proportioned charge can also be useful for portable electronic devices distributed by a company to its employees. In such a case, the company may pay for 50% of bandwidth consumed by a user during working hours.

Rewards can also be utilized in other ways. For example, in an embodiment, a child is required by a parent to complete two hours of studying (e.g., two hours of use of an educational application or website, with the device or without the device and measured through other means). As a reward, upon completion of the required studying, the student is provided with unlimited texting access on the device for 24 hours. In another embodiment, a child may be required to take an online test, or complete some other quantitative assignment. Instead of rewarding the child for completing the task, the child may only be rewarded upon reaching a qualitative objective (e.g., a test score above 80%). In each embodiment, the rewards can vary significantly, from obtaining access to a game (e.g., entertainment application), obtaining internet access beyond the educational website, obtaining credits toward other device uses, obtaining extended periods of utilization of the device outside of normal restrictions, etc.

As indicated above, a wallet can be used to enable a user to pay for additional products and services. For instance, a parent can associate a wallet with a school issued device given to the child. The parent can fill the wallet with credits enabling the child to pay for lunches, purchase e-books during e-book sales, or purchase access to supplemental subscriptions, such as research websites, encyclopedias, or optional courses that are not school-system funded. The wallet can also be used to enable the child to pay for parentally sponsored or funded web-based activities. For instance, if a fee is needed for a field trip, the wallet can be used to pay for such expenses. And, while the term "child" is used to refer to students, it is anticipated that embodiments disclosed herein could be implemented in adult school environments, such as colleges, universities, training schools, military academies, etc., whether the students are adults, not children.

As noted above, embodiments of the tracking, administration and monitoring of services are not limited to communication devices. Policy management and enforcement as described herein can also be applied to features of electronic devices accessible through the devices. For instance, a parent can manage a child's access to social networking sites, such as a FACEBOOK site, via the child's desktop computer. The parent can configure and create rules that limit the time of day when the social network site can be accessed, limit the features that can be accessed on the social network site, limiting the contacts and "friends" in the social network site, etc. The policy management can also maintain a log enabling the administrator or parent to monitor usage of certain applications or certain web sites. In terms of a social networking site, monitoring usage would enable a parent to track the number of posts made by a child per day, the cumulative usage time, and the amount of time spent playing video games via the social network site.

The parent/administrator may even specify rules to monitor other users who attempt to contact the child. For instance, if the child receives a message or a friend request from a user who meets a number of criteria specified in a rule or in a contact filter, then an alert can be sent to the parent, or a message can be stored in the feature management interface for the parent to see next time the parent accesses the feature management interface. Rules and corresponding alerts can be created for a plurality of conditions, such as when any adult user sends a message or a friend request to the child. Metadata from device usage could be used to create dynamic controls, such as through a learning system (e.g., using a neral network algorithm or other learning algorithm) that uses data from devices or the policy decider/enforcers to develop better rules for some or all devices, deciders or enforcers going forward. Policy management can be used to allow broadcast messages, through any or all forms of communication (voice, data, URL, SMS, etc., or all of these at once) to communicate urgent public safety announcements, Amber alerts, weather warnings, civil defense messages, etc. Policy management can also be used to enforce "least cost routing" rules for communication functions, or other similar types of rules. For example, a least cost routing rule could require the device or the decider/enforcer system to compare the relative cost of using different networks detected as being available to the device and selecting the least costly route for a communication function(s) to be performed. For example, within a school environment, there might be an available, free WiFi network or an available, but more costly, Radio Access Network, so the rule would specify that the device should use the WiFi network for a communication function. The possibilities are limitless, with the rules being as detailed as necessary or as desired by the administrator/parent.

While the example above refers to a social networking site, similar rules can be applied to control and monitor usage of other websites, desktop applications, video game applications, etc. As indicated above, access and usage of services or applications can be controlled based on the time of day or the day of the week. For instance, the parent may specify that the child is not allowed to access social network sites after 10 pm. Similarly, the parent may limit usage of certain applications to a specified amount, such as limiting access to a video game to at most 1 hour per day.

As initially described above, embodiments further include location based controls. Voice, text, data, and who pays for the respective services and applications can be controlled by location. Location rules or policies can also be combined with rules and policies based on time of day. For instance, calls only to emergency numbers can be allowed while a child is on school property. Alternatively, the school may pay for various usage costs when the child is on school property, such as network usage costs. The services may also be limited depending on the location and who is paying for services. When a child is in school, data access may be limited to levels selected by the educational site. In a company, while the employee is on work premises, data usage and other services may be limited. For instance, while employees are at work, employees may be allowed to visit certain websites, but not websites that consume a high level of bandwidth. Alternatively, rather than listing websites that are allowed and websites that are not allowed, an administrator may instead set a bandwidth limit on devices used by employees while at work.

Tags or meta-data can also be used to identify an electronic device, such as a computer or a mobile device, as being owned by a child or a minor. While a number of websites use the meta tag "rating" to rate the appropriateness of the content with regards to a general audience, a mature audience, or a minor audience, it is generally the website operators that provide that rating (so trust can be an issue) and it is up to the client device to take action based on the rating of the website. However, not all websites include such ratings, and even in those cases when the websites do include such ratings, the client device, or even the user, may choose to ignore such rating. Therefore, even if a website is rated to have mature content, there is nothing stopping the user from accessing the website. In some cases, the user is required to enter their birth date to verify whether the user is a minor However, this verification simply consists of having the user enter a birth date that is not verified, and hence a user could provide a false birth date to access the website. Thus, even if a website includes a content rating, the website does not have any control over what is displayed to the client device and does not have the ability to prevent a minor from accessing the website if the minor is intent on doing so.

Embodiments resolve this problem by tagging a device as being used by a minor or a child. This information can be sent with the initial client request for a website, or in a subsequent request to the website. Based on the tag received, the website can then decide whether to make the website content accessible.

In embodiment, instead of relying on a website making content available to determine whether content can be accessed by a device based on information provided by that device, or relying on the website to broadcast rating information about its own content so the device can decide whether to allow access to that content, a website controlled by the device provider, a service provider to the device, or a third party, could gather information about other websites and broadcast that information to the device or otherwise use that information to control the device's access to other websites. For example, a type of rating website could collect information from many different sources that allows that website to rate other websites based on the domain name of the websites and the content available at each of those websites and then transmit that information to the device (which is configured to listen to the broadcast) so as to allow the device to manage user access the websites. Referring back to FIG. 4B, an example of how such website filtering works is illustrated. As shown in FIG. 4B, the categories of website content that can be controlled through the Kajeet Smart Blocker is determined by collecting information about the different types of websites and then categorizing them accordingly, so access to such websites can be appropriately controlled.

The tag or meta-data can provide a plurality of information. The information can include personally identifying information of the user, when appropriate, or in many cases non-personally identifying information of the user, such as the age of the user, the sex of the user, the jurisdiction of the user, etc. In some embodiments, taxing can be performed based on the jurisdiction identified in the tag or meta-data.

The tag or meta-data can also include more than identifying information. In alternative embodiments, it can alternatively or further include a set of preferences and even a set of rules or policies. For instance, the tag may specify that mature content is not to be displayed within the device, thereby enabling the remote service or website to take a corresponding action without having to obtain any other information about the user of the client device.

Once a website, or the remote server hosting an application or service, has received the tag or meta-data identifying the device as being that of a minor, then the website can take the necessary steps to avoid presenting the website content to the user. For instance, certain mature websites ask the user whether the user is 18 or over, and if the user answers that he/she is under 18, then the user is directed to a different website or otherwise denied access. However, as noted above, nothing stops the user from providing false information and selecting the 18 and over option. On the other hand, once a website has parsed the tag or meta-data identifying the client device as being owned by a minor, the website can redirect the user to a different website without prompting the user. Alternatively, the website may display non-offensive material, a blank web-page, an HTTP error message, some other content, etc. Similar actions can be taken when the tag or meta-data provides other information. For example, if the tag or meta-data includes a rule specifying that profanity is not to be displayed to the client device, then the remote website may redirect the user to a different website, it may display an alternative website without the use of profanity, or may blank spaces or advertisements in place of the profane words when the website is displayed.

The tag or meta-data can follow a plurality of specifications and standards. The meta-data may be formatted in raw text, comma-separated values, XML, HTML, YAML, JSON, or any other data format or mark-up language. What is important is for a common protocol to be used to enable a device to communicate the proper meta-information to a website or other remote service or application.

In an embodiment websites can comply with a standard of how to react. For instance, a regulation could be added to the Children's Online Privacy Protection Act (COPPA) requiring the use of a tag or meta-data for devices used by children or minors.

Embodiments can further enable location detection and location tracking for a plurality of users, as further described above and below, including the ability to locate a phone from a plurality of carriers and identify the speed of the device. Location tracking can be used for checking whether a user arrived at a certain destination, whether a user followed a specific route, or whether the user has moved in a period of time. A feature enabling an administrator to check whether a user arrived at a certain destination can be used by a parent to determine whether a child arrived safely to school, arrived safely at home, or arrived at some other destination. An employer can use the location tracking to determine whether an employee is going to the intended destinations rather than taking unnecessary side trips, or even to analyze the routes followed by employees in order to find alternative or more efficient routes.

The simple tracking of whether a user has moved can be used by an individual to check on ill or elderly users or relatives. As indicated above, alerts can be generated in response to one or more conditions associated with location. For instance, an alert can be sent when a user departs from a starting location and a second alert can be sent when the user arrives at an ending location. Similarly, if the location of an elderly or sick relative has not moved for a period of time, this can trigger an alert to be sent to one or more users or emergency contacts. The alert may consist of a voice message, a text message, an email, an instant message, a message via a social networking website, or a message via some other website.

Location tracking has also uses for educational purposes. Policy settings can permit the publication of geocodes to specifically authorized users or applications. A parent may specify that the child's teacher, tutor, or any individual from an educational institution can obtain location information for the device of the child. The parent may also set the policy to enable one or more apps access to the location information, enabling a teacher's application or some other application used by an educational institution to obtain the location information of the device of the child. Such functionality would enable a teacher to perform an instantaneous location-based roster-check during class, during recess, during field trips, etc. In a particular embodiment, if a child is not present, then an alert may be sent from the teacher's device to the child's device notifying the child to approach the teacher. In such an embodiment the alert sent by the teacher can further include the teacher's location, enabling the child to know where to meet the teacher.

In embodiments, the policy manager can meet Children's Internet Protection Act (CIPA) compliance under certain conditions, including with the addition of filtering options available for purchase by parents. Filtering solutions can also consist of a white listing of sites, such as educationally provided sites, parent-paid sites, and additional paid usage.

Wallets provide granular control over usage and spending by one or more users. In the case of a parent and a child, wallets provide a high degree of control over the usage and spending by the child. The controls can include enabling a device to use WiFi when available, turning off the device when it is not appropriate for the device to be used, turning off a communication device when a child is in school. These controls can be based on the time of day, the day of the week, the day of the year, and the location. Controls further provide alerts to be associated with a plurality of events, including events associated with certain usage and spending events. For instance, a simple alert can be set up that sends a text message to a parent whenever a child sends more than 100 text messages in a day or the transmission of any image using the device. A more complex alert can consist of sending a text message whenever a child sends a text message or image during school hours or during an after-school tutoring session.

Spending limits can be hard or soft. Hard limits do not allow a user to perform a service once a spending limit has been reached. In a parent-child case, if a child is given a hard daily limit of 100 text messages, then the child is allowed to send at most 100 text messages per day. Alternatively, a soft limit may notify the user that the limit has been reached, in addition to providing the user with an extra quota for the day. For instance, if a user sends 100 text messages during a day and the user has a daily limit of 100 messages, the user may be notified that the daily limit has been reached and given five additional texts (or some other amount designated by the administrator) that may be used for the remainder of the day. Alternatively, usage can be throttled after a user has reached a daily limit. For instance, once the daily limit has been reached, the user may only be allowed to send one text message and receive one text message once per hour for the remainder of the day. Alerts can also be associated with daily limits, informing the user or the administrator when the user has exceeded the limit, or is approaching the daily limit.

Similar to alerts associated with other events, the alerts can be configured extensively by the user or an administrator. For instance, the administrator can set up a first alert to be sent to the user once the user has used 80% of the daily limit, a second alert to be sent to the user once the user has used 90% of the daily limit, and a third alert sent to the user and to the administrator once the user has used all of the daily limit.

In one embodiment, the usage patterns relating to voice calls, testing, data consumption, content and application usage, location and context (prior—and post—user activities) associated with one or more devices can be captured in database for analysis. The data captured in the database can be used by a parent to examine the consumption patterns and usage patterns of the family members. An employer can similarly examine the database to determine which employees or departments use the most services or applications, or even to determine which services and applications are the most used and least used. An education institution may use such a database to search for correlations between grades and other learning outcomes with precise elements of device usage by a user or population of users. The database can also be used to monitor and control policies. For instance, after examining the database it may be determined that bandwidth consumption needs to be limited daily due to increased bandwidth consumption costs. Among other factors, the database can provide insight as to what services or applications were consumed and when the particular services or applications were consumed. All of the data in the database could also be examined for research purposes. In particular, the aggregate behavioral information can be valuable to employers, organizations, advertisers, educational institutions, and researchers.

In one embodiment, in association with a device controlled by the policy decider and the policy enforcer disclosed herein, an administrator can have pre-set permissions enabling the administrator to take control of the screen output of the device, gain access to the files and applications in the device, etc. In a classroom environment, the teacher can take control of the screen output of a device assigned to one of the students, thus allowing other students to see the screen output of the selected student. This functionality further enables the teacher to share and review the student's work, and to monitor the student at various times throughout the day.

Yet another embodiment is directed to a policy/control system on a device that uses an encrypted digital certification to verify the identity of the user, and consequently imposes a set of policies and rules associated with access to a plurality of resources. The encrypted digital certification, which may also consist of a simple pass code, can be distributed to a plurality of users. The encrypted digital certification is stored on each user's device. Whenever a user wishes to use the device to gain access to the plurality of resources, the encrypted digital certification is transmitted from the device to the system or the host of the plurality of resources. If the digital certification is validated, an application can be automatically downloaded to the device, with the application imposing a set of policies and controls on the device associated with access to the resources. In other words, such an embodiment allows for a policy/control system to be imposed by an entity on various devices accessing the entity's system. In an educational institution setting, this certification method would allow the educational institution to impose policies on devices of faculty, students, and guests accessing and making use of the educational institution's resources. Different policies can be distributed depending on the type of user. Administrative members may receive a different set of policies than faculty, and students may receive yet another set of policies different than the set of policies assigned to faculty and administrative members.

FIG. 8 is a block diagram illustrating the relationship between the policy enforcer(s) with the policy decider(s), and between the policy decider(s) with a plurality of user interface (UI) layers. The policy enforcer communicates with the policy decider, or one or more policy enforces communication with one or more policy deciders, whenever an activity or event occurs on a device managed by the policy/control system described herein. The policy decider can subsequently be accessed and customized via a plurality of UI layers. The UI layers presented in FIG. 8 are not meant to an exhaustive list of UI layers, rather FIG. 8 merely illustrates a representative subset of the various UI layers. The mobile application UI layer represents interfaces via applications on mobile devices, smart phones, etc. The webpage illustrated in FIG. 3 is an example of a website UI layer, where the user can access the website via a plurality of devices, and it is through the website that the user customizes the policy decider.

Figure 10:
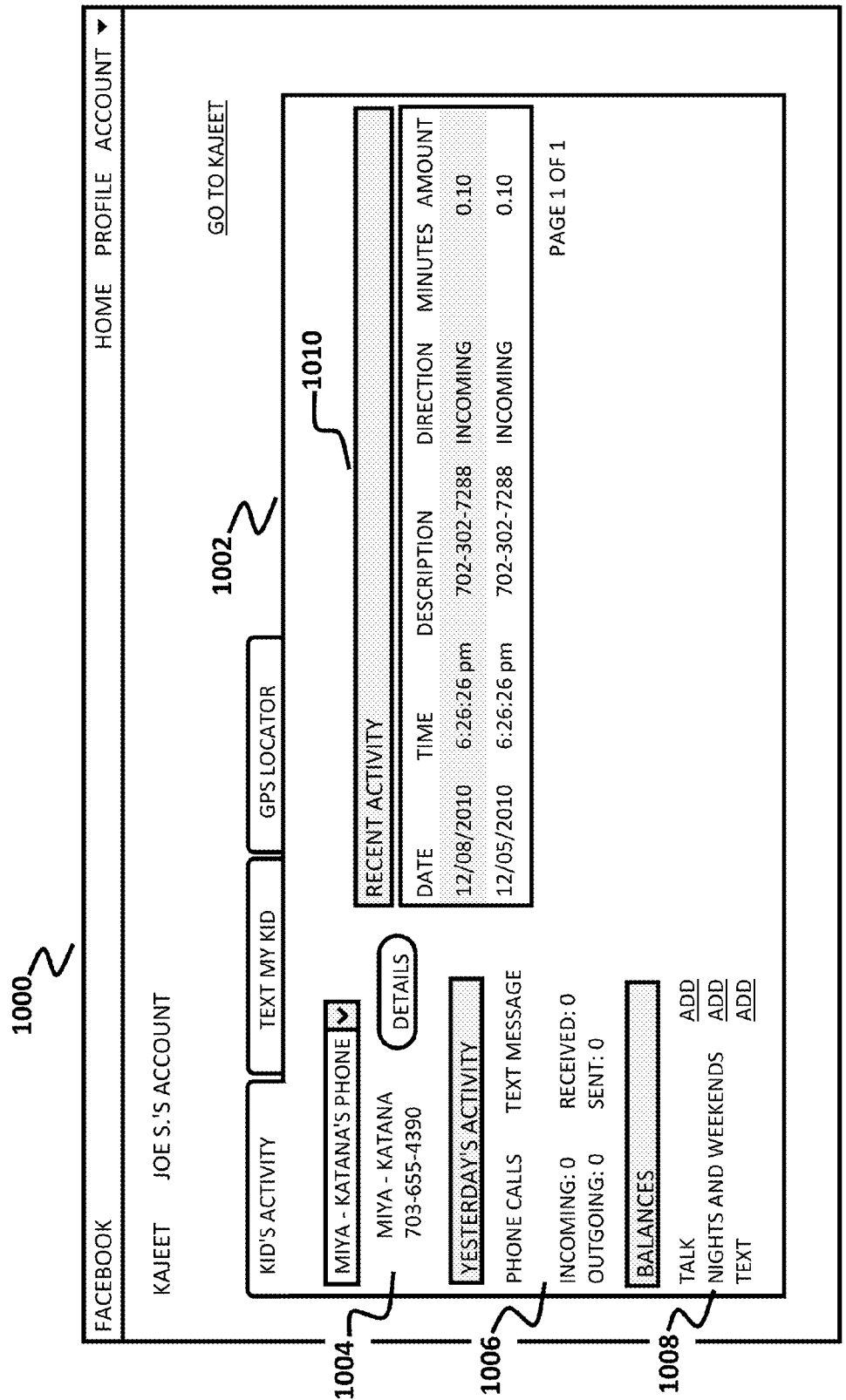
FIG. 10 illustrates a FACEBOOK user interface layer for customizing the policy decider in accordance with an embodiment.

The social network UI layer illustrated in FIG. 8 allows users to customize the policy decider via social networking websites or via social networking applications. As further described below, FIG. 10 illustrates an example of a social network UI layer for the FACEBOOK website. Other social networking websites include MYSPACE, TWITTER, and LINKEDIN, among others. The YAHOO widget UI layer allows users to access and customize the policy decider via a desktop widget. The YAHOO widget UI layer is meant to represent the UI layer associated with desktop widgets, mobile widgets, and web widgets, versus just the YAHOO website on its own. Finally, the other application platforms UI layer encompasses other UI layers through which the policy decider can be customized, including a desktop application for a plurality of operating systems, a command line interface, etc.

As indicated above, the policy enforcer 802 communicates with the policy decider 804 whenever an activity or event occurs on a device managed by the feature management described herein. If a user attempts to make a phone call or otherwise use the device to communicate in any way (such as through a network, website, Voice Over the Internet Protocol, text, SMS, etc., which is also referred to as making the call herein for ease of understanding), then the policy enforcer first queries the policy decider to determine whether the user is allowed to make the phone call. As described above, the policy decider maintains a plurality of rules including a user's control preferences associated with one or more devices. The policy decider can communicate the rule or a decision associated with a request, with the policy enforcer subsequently taking the appropriate actions to implement the decision. Thus, if the phone call is to a contact listed on an allowed calling list, then the policy enforcer allows the call. On the other hand, if the phone call is to a contact listed on a blocked calling list, then the policy enforcer blocks the call. The policy decider can check a plurality of rules before issuing a policy decision. If the phone call to a contact on the allowed calling list is made during school hours, when only emergency calls are allowed, then the call may not be allowed.

FIG. 9 is a block diagram illustrating in further detail the relationship between the policy decider and a plurality of policy enforcers. Rather than having a single policy enforcer, in a particular embodiment the policy decider can interact with a plurality of policy enforcers, or vice versa, with each policy enforcer customized to a particular device, service, or application. The decider may have rules specifying: "do not allow my child to use profanity" or "do not allow my child to use sexting" or "do not allow my child to send naked pictures", etc. Each enforcer would then enforce these one or more rules accordingly, in appropriate circumstances. The mobile phone enforcer, interacting with a mobile phone, may enforce this rule by examining text messages as they are being typed or prior to sending the text messages. The policy enforcer may subsequently enforce the decision communicated by the policy decider by not sending text messages including profanity, not receiving text messages including profanity, by automatically removing the actual profane words from the text message, by automatically removing the entire sentence including the profanity, by notifying the parent via an alert that the child has used profanity, by prompting the child to remove the use of profanity, etc. The actual steps taken to enforce a policy will be dependent on the actual policy, and on the particular device, service, or application being managed.

A parent or administrator could have the option of defining what constitutes "profanity" by creating their own list of prohibited words. Since some parents might have issues with creating such a list, or might recognize that they do not necessarily know all of the profane words their child could use, the parent could access an external source that provided a constantly updated list of profane words, as word usage changed among young people. The provider of the policy service could also provide such a service where a user need only select an option on a webpage to have one or more sources used for determining profanity. Similar policies could be established for other purposes, such as preventing employees from using the names of the employer's clients in text messages or communicating other types of information. Likewise, a policy could be used to prevent a child from using text message abbreviations, such as "LOL" for "laughing out loud" or "MoS" for "mother over shoulder".

FIG. 9 further illustrates a FACEBOOK enforcer, an email enforcer, an instant messaging enforcer, and other enforcers. The FACEBOOK enforcer is a specific example of an enforcer for a social networking website or application, which as noted above may include the TWITTER website, the MYSPACE website, the LINKEDIN website, etc. The FACEBOOK enforcer, when monitoring profanity, may not allow a child to post status messages or other messages that include profanity. As a further example, the policy decider can include a rule specifying: "do not allow my child to post pictures without admin approval." The FACEBOOK enforcer would subsequently monitor any uploads attempted by the child to the FACEBOOK website. Whenever a picture upload was attempted, an alert could be sent to the parent, the child could be notified to seek parent approval, or the pictures could be queued for approval via one of the policy decider UI layers. These examples are merely illustrative and are meant to showcase the flexibility and scalability of embodiments described herein.

It is also to be understood that the rules may not be stored by the decider in plain English. That is, rather than simply writing a sentence describing a rule, an administrator may be presented with a set of tools that can be used to create the rules. For instance, the administrator can be presented with a "censor" option, with any words or phrases entered within a textbox associated with the censor option being censored. Alternatively, as noted above, the user may simply select a checkbox censoring profanity, with the enforcer automatically checking a database of profane words.

FIG. 9 further illustrates an email enforcer, an instant messaging enforce, and other enforcer. Other enforcers include an enforcer for a gaming device, such as a PS3 device, a XBOX device, or a handheld gaming device. As indicated above, the enforcer can also apply to a desktop computer, a laptop, a smart phone, a tablet computer, a portable media player, etc.

In one embodiment, a single policy enforcer may be used for one or more devices, services or applications. For example, the logic associated with enforcing the use of profanity may be the same for all social networking websites. In such a case, rather than having an enforcer for each social networking website, a single enforcer can be applied to a plurality of social networking sites. If necessary, an additional sub-enforcer including implementation specific details to a particular social networking website can be created.

FIG. 10 illustrates the FACEBOOK interface 1000 for feature management and the policy/control system as described herein. The embodiment of the feature management application 1000 allows a parent to track his/her child's activities associated with a mobile device. However, as has been described above, embodiments can be implemented for other devices, such as a child's gaming device, a child's music player, etc. The embodiment illustrated in FIG. 10 provides the user with three tabs, with each tab providing different feature control and management. Whenever a tab is selected by the user, the corresponding controls are displayed within the center panel 1002. The three tabs illustrated are "Kid's Activity," "Text My Kid," and "GPS Locator." The "Kid's Activity" tab displays the activity for a parent's child. Drop down menu 1004 enables the parent to switch between various devices and users that are tracked by the parent. The currently selected device is "Miya-Katana's Phone." The drop down menu may be filled with the names of all of the parent's children, or it may also be filled with the names of all family members. The drop down menu may also display various devices for a single user. For instance, the drop down menu may also include "Katana's IPOD," "Katana's XBOX," "Mike's PS3," "Mike's Personal Laptop," "Mike's School Laptop," etc.

In FIG. 10, the center panel 1002 also displays a summary of recent activity associated with the mobile device, such as the yesterday's activity subpanel 1006, which displays the number of phone calls and text messages sent and received in the previous day. A balances subpanel 1008 enables the parent to add to the balance of talk minutes, nights and weekend minutes, and text messages. When the user clicks on the "Add" link in the balances subpanel 1008, the user may be prompted in various ways to add to the various balances, including transferring credits or funds from one or more wallets, adding funds from a charge card or a credit card, adding or transferring funds from a dynamic wallet, or simply having the added balance charged to a bill associated with the parent's device. Finally, the recent activity subpanel 1010 displays recent activity associated with the selected device. The recent activity subpanel 1010 displays the date, time, description, direction, minutes, and amount associated with each event or activity.

It is to be understood that the interface illustrated in FIG. 10 can be customized and varied without departing from the spirit of the invention. For instance, the yesterday's activity subpanel 1006 can cover a different time period, include a separate count for the number of multimedia messages sent and received, etc. Similarly, the balances subpanel 1008 can include the ability to add balances for multimedia messages, for wallpapers, for ring-tones, for music downloads, etc.

Finally, it is to be understood that the feature management interface 1000 will display different options based on the type of device currently selected. For instance, if the device selected is a gaming device, such as an XBOX device, then the yesterday's activity subpanel 1006 may display the total amount of hours spent playing games, the total amount of hours spent watching movies, the total amount of megabytes downloaded, the titles of games played, etc. The balances subpanel 1008 may allow the user to add balance credits enabling the child to download video games, music songs, or movies via the XBOX device. Finally, the recent activity subpanel 1010 may show the amount of time that the child spent on each recent activity, such as the amount of time playing a first game, the amount of time playing a second game, the name and charge associated with a recent music download, the name and charge associated with a recent video game download, etc.

The feature management interface 1000 can be configured by the parent based on the degree of control and information the parent is interested in tracking and analyzing. For instance, the parent may add further details to be displayed in the yesterday's activity subpanel 1006, such as the total number of minutes used in incoming calls, the total number of minutes used in outgoing calls, the total number of minutes used in calls with the parent, the total number of minutes used in calls with a specific contact, etc. The yesterday's activity subpanel 1006 itself may be changed so that it presents a summary of activity over a period of time, rather than only displaying activity from the previous day. The parent could be given the option to make the yesterday's activity subpanel 1006 display the activity for the last 2 days, for the last 3 days, for the last n days, or for the current billing cycle. The parent can also have the option of removing information that the parent is not interested in tracking. The parent may be interested in detailed activity for text messages, but may choose to hide all activity associated with phone calls.

In the recent activity subpanel 1010, the parent can also customize the fields that are displayed for recent activities or events. The parent may only want to view the date, the description, and the amount spent on each activity. On the other hand, another parent may want to view additional details, such as the start time of the activity or event, the end time of the activity or event, and contact information, if available, associated with the remote user or remote device associated with the activity or event.

While not further illustrated, the "Text My Kid" tab in FIG. 10 enables the parent to send one or more communications to the user through various means. The communications sent can include text messages, multimedia messages, emails, instant messages, a message sent via a social networking website (such as a message via the FACEBOOK website), etc. The sending of communications is not limited to the sending of messages to a mobile device. Communications can also be sent to other devices manually or automatically. When sending communications manually to another type of device, the parent first chooses the device to receive the communication, followed by the parent choosing the type of communication to use. For instance, if the parent wishes to send a communication to the child's XBOX device, then the parent can manually select the XBOX device from a list of devices associated with the child, followed by a selection of sending a message to the child's XBOX LIVE account. When sending communications automatically, the parent can select the device associated with the child, and the feature management interface will automatically select the appropriate communication to send based on a set of rules. For example, if the device selected is a laptop, then the rules may specify that an email is to be sent. The rules can also depend on one or more status states, such as availability of the child. The instant messaging status of the child in a plurality of websites and applications can be checked first. If the status of the child indicates that he/she is online, then an instant message may be delivered to the child. On the other hand, if the status of the child is offline, then the rules may default to sending an email. In particular, the FACEBOOK application supports threaded texting to communication devices without having to leave the FACEBOOK application.

The "GPS Locator" tab illustrated in FIG. 10 can enable the parent to track the current location of each of the devices managed by the parent, and consequently track the location of the child or other family members. The GPS Locator interface can also enable the user to associate alerts with one or more GPS events. If the child's location is not within a radius of a school property during school hours, then an alert may be sent to the parent. If the child is expected to be at a specific location at a specific time, then an alert can be sent to the parent. As indicated above, the GPS locator can also be used to track movement versus no movement. For instance, if the GPS location of an elderly or ill family member has not changed for a period of time, then an alert can be sent to the parent, to an emergency number, or to one or more other users. The GPS locator can also be particularly useful when a device is stolen. The GPS locator can also be used to determine which applications are publishing GPS information about the device, and who has access to such GPS information.

It is to be understood that while FIG. 10 has been described in the context of a parent managing features of the mobile device of a child, the feature management described in FIG. 10 is also applicable to an administrator managing a plurality of devices used by one or more users, an employer managing a plurality of devices by employees, etc.

Figure 11:
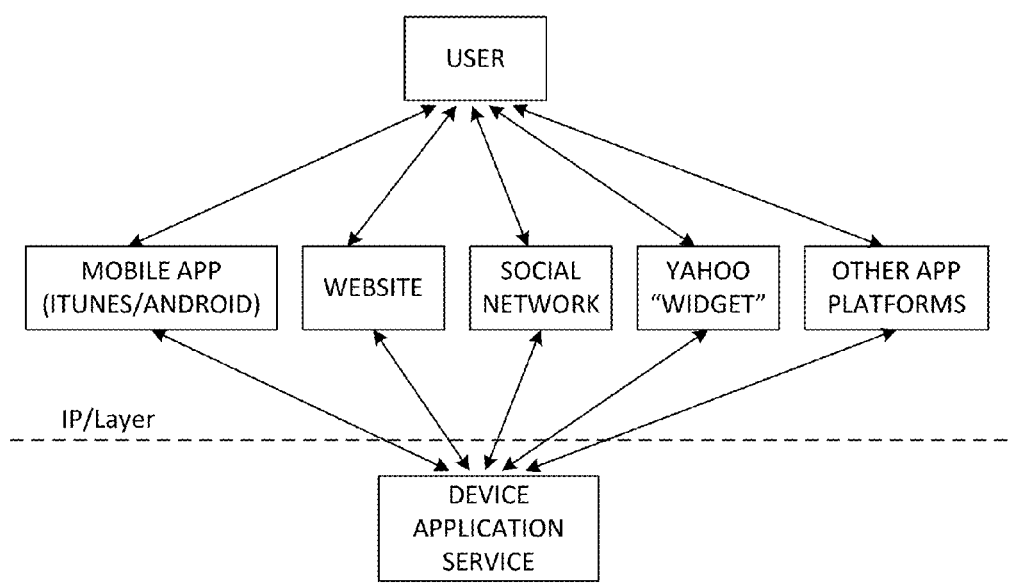
FIG. 11 illustrates a client-server and/or chip set architecture over an IP connection or layer enabling a user to customize the policies for a device via a plurality of user interface layers.

FIG. 11 illustrates an embodiment of the policy/control system described herein implemented within a server-client architecture or within a chip set architecture. A user can customize the policy/control system via a plurality of UI layers or other device layer. The layers can communicate with the corresponding device, application, or service via an IP connection or other layer communication medium, such as within a chip set, within a device's architecture, within an operating system, etc., rather than requiring the communication to take place over an additional network, such as a carrier network.

While the present invention has been illustrated and described herein in terms of a preferred embodiment and several alternatives, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed:

1. A method for managing a plurality of computing devices, the plurality of computing devices communicatively coupled to a communications network that is at least partially coupled to a control platform comprising at least one server, the method comprising:

accessing, by the control platforms, a first database of content and web sites that are selected for controlled access by the plurality of computing devices, the first database being a subset of a larger database of content and web sites including a second database of content and web sites not selected for controlled access by the plurality of computer devices;

storing one or more policies for controlling time-based access to the first database of content and websites by the plurality of computing devices; and based on the first database and the stored policies, controlling, in real-time, access to the content and web sites of the first database by the plurality of computing devices and based on the second database and the stored policies not controlling access to the content and web sites of the second database by the plurality of computing devices.

2. The method of claim 1, further comprising:

allocating a first amount of units of value into an allowance associated with the controlled real-time access; and decrementing units of value from the allowance during the controlled real-time access based on the one or more policies.

3. The method of claim 2, wherein the first amount of units of value are provided by an educational institution.

4. The method of claim 1, wherein the plurality of computing devices are identified as being associated with an educational institution by tags or metadata.

5. The method of claim 1, further comprising using geocodes to determine locations of the plurality of computing devices.

6. The method of claim 1, wherein the plurality of computing devices comprises mobile phones.

7. The method of claim 2, wherein the units of value represent credits for paying for the controlled real-time access.

8. The method of claim 1, wherein the one or more policies manage any of a type and an amount of content that can be sent, received, or used by the plurality of computing devices.

9. The method of claim 1, wherein the controlling access to the content and web sites of the first database comprises sending data indicative of an action to enforce a decision to allow the access.

10. The method of claim 9, wherein the action to enforce the decision comprises terminating a request, redirecting the request, or degrading the request.

11. The method of claim 9, wherein the data indicative of the action includes a notification of a denied request directed to an educational institution or a user of a requesting device.

12. A system for managing a plurality of computing devices , the system comprising a processor and memory comprising instructions that, when executed by the processor, cause the system to:

store data indicative of content and web sites that are selected for controlled access by the plurality of computing devices, the content and web sites including a first set of content and web sites and a second set of content and web sites;

store one or more policies for controlling time-based access to the first set of content and web_sites and the second set of content and web sites by the plurality of computing devices; and based on the data indicative of content and web sites and the stored policies, controlling, in real-time, access to the first set of content and web sites by the plurality of computing devices;

wherein access to the first set of content and web sites by the plurality of computing devices is further controlled by an enforcer function executing at another system, and wherein access to the second set of content and web sites by the plurality of computing devices is not controlled.

13. The system of claim 12, further comprising instructions that, when executed by the processor, cause the system to:

allocate a first amount of units of value into an allowance associated with the controlled real-time access; and decrement units of value from the allowance during the controlled real-time access based on the one or more policies.

14. The system of claim 13, wherein the first amount of units of value are provided by an educational institution.

15. The system of claim 12, wherein the plurality of computing devices are identified as being associated with an educational institution by tags or metadata.

16. The system of claim 12, further comprising instructions that, when executed by the processor, cause the system to us geocodes to determine locations of the plurality of computing devices.

17. The system of claim 12, wherein the one or more policies manage any of a type and an amount of content that can be sent, received, or used by the plurality of computing devices.

18. The system of claim 12, wherein the controlling access to the first set of content and web sites comprises sending data indicative of an action to enforce a decision to allow the access.

19. A system for managing a plurality of computing devices , the system comprising a processor and memory comprising instructions that, when executed by the processor, cause the system to:

in response to a request to use a function by one of the plurality of computing devices, generate a real-time decision to grant or deny the request based on a policy that is operative to restrict the use of the function;

enforce the decision by sending, to the one computing device, data indicative of an action that is consistent with the decision;

wherein the decision is based on:

data indicative of content and web sites that are selected for controlled access by the plurality of computing devices, the content and web sites including a first set of content and web sites and a second set of content and web sites; and one or more policies for controlling time-based access to the first set of content and websites by the plurality of computing devices; wherein access to the first set of content and web sites by the plurality of computing devices is further controlled by an enforcer function executing at another system, and wherein access to the second set of content and web sites by the plurality of computing devices is not controlled.

20. The system of claim 19, wherein the one or more policies are generated based on input by an educational institution.

* * * * *